US010087554B2

(12) United States Patent
Lozano et al.

(10) Patent No.: US 10,087,554 B2
(45) Date of Patent: Oct. 2, 2018

(54) METHODS FOR THE PRODUCTION OF FLUOROPOLYMER FIBERS

(75) Inventors: Karen Lozano, McAllen, TX (US);
Yatinkumar Rane, McAllen, TX (US);
Nelson Bell, Albuquerque, NM (US)

(73) Assignee: Board of Regents of the University of Texas System, Austin, TX (US)

( * ) Notice: Subject to any disclaimer, the term of this patent is extended or adjusted under 35 U.S.C. 154(b) by 1362 days.

(21) Appl. No.: 14/004,049

(22) PCT Filed: Mar. 9, 2012

(86) PCT No.: PCT/US2012/028503
§ 371 (c)(1),
(2), (4) Date: Feb. 18, 2014

(87) PCT Pub. No.: WO2012/122485
PCT Pub. Date: Sep. 13, 2012

(65) Prior Publication Data
US 2014/0154493 A1   Jun. 5, 2014

Related U.S. Application Data

(60) Provisional application No. 61/451,032, filed on Mar. 9, 2011.

(51) Int. Cl.
| | |
|---|---|
| *B29C 41/04* | (2006.01) |
| *C08F 14/18* | (2006.01) |
| *C08F 14/20* | (2006.01) |
| *C08F 14/22* | (2006.01) |
| *C08F 14/24* | (2006.01) |
| *C08F 14/28* | (2006.01) |
| *D01D 7/02* | (2006.01) |

(Continued)

(52) U.S. Cl.
CPC ............ *D01D 7/02* (2013.01); *B29C 41/042* (2013.01); *B29C 41/045* (2013.01); *C08F 14/185* (2013.01); *C08F 14/26* (2013.01); *D01D 5/18* (2013.01); *D01F 6/12* (2013.01); *Y10T 428/249921* (2015.04)

(58) Field of Classification Search
CPC ..... B29C 41/04; B29C 41/042; B29C 41/045; B29C 41/047; B29C 41/06; C08F 14/18; C08F 14/185; C08F 14/20; C08F 14/22; C08F 14/24; C08F 14/26; C08F 14/28; D01D 5/18; D01F 6/12
USPC .... 264/8, 211.1, 310, 311, 331.15; 526/249, 526/250
See application file for complete search history.

(56) References Cited

U.S. PATENT DOCUMENTS

| | | | |
|---|---|---|---|
| 7,118,698 | B2 | 10/2006 | Andrady et al. |
| 7,655,175 | B2 | 2/2010 | Gerhard et al. |

(Continued)

OTHER PUBLICATIONS

Han et al. "Superhydrophobic and Oleophobic Fibers by Coaxial Electrospinning" Langmuir, 2009, 25, 9454-9462.

(Continued)

*Primary Examiner* — Leo B Tentoni
(74) *Attorney, Agent, or Firm* — Meyertons, Hood, Kivlin, Kowert & Goetzel, P.C.; Mark R. DeLuca

(57) ABSTRACT

A method of producing fibers, includes placing a composition that includes one or more fluoropolymers in the body of a fiber producing device and rotating the device at a speed sufficient to eject material from the fiber producing device to form fluoropolymer microfibers and/or nanofibers.

15 Claims, 28 Drawing Sheets

(51) Int. Cl.
*D01D 5/18* (2006.01)
*D01F 6/12* (2006.01)
*C08F 14/26* (2006.01)

(56) References Cited

U.S. PATENT DOCUMENTS

| | | | | |
|---|---|---|---|---|
| 8,551,378 | B2* | 10/2013 | Velev | D01D 5/40 |
| | | | | 264/211.1 |
| 2005/0053782 | A1 | 3/2005 | Sen et al. | |
| 2006/0228435 | A1 | 10/2006 | Andrady et al. | |
| 2008/0029617 | A1* | 2/2008 | Marshall | D01D 5/18 |
| | | | | 239/214.17 |
| 2009/0127748 | A1* | 5/2009 | Takahashi | D01D 5/18 |
| | | | | 264/465 |
| 2009/0160099 | A1 | 6/2009 | Tao | |
| 2009/0232920 | A1* | 9/2009 | Lozano | D01D 5/18 |
| | | | | 425/72.2 |
| 2009/0269429 | A1 | 10/2009 | Lozano et al. | |
| 2010/0129628 | A1* | 5/2010 | Young | D01D 5/18 |
| | | | | 264/211.1 X |
| 2010/0193999 | A1 | 8/2010 | Anneaux et al. | |
| 2010/0297906 | A1 | 11/2010 | Steckl et al. | |
| 2010/0304108 | A1* | 12/2010 | Doshi | D01D 5/0038 |
| | | | | 264/465 X |

OTHER PUBLICATIONS

Minglin et al. "Electrospun Poly(Styrene-block-dimethylsiloxane) Block Copolymer Fibers Exhibiting Superhydrophobicity" Langmuir 2005, 21, 5549-5554. (Abstract).

Scheffler et al. "Electrospun Teflon AF fibers for Superhydrophobic Membranes" J. Mater. Res. 2010, 25, 1595-1600. (Abstract).

Muthiah et al.Coaxially Electrospun PVDF-Teflon AF and Teflon AF-PVDF Core-Sheath Nanofiber Mats with Superhydrophobic Properties. Langmuir 2010, 26, 12483-12487.

Borkar et al. "Polytetrafluoroethylene Nano/Microfibers by Jet Blowing" Polymer 2006, 47, 8337 8343.

Burkarter et al. "Superhydrophobic electrosprayed PTFE" Surface & Coatings Technology 2007, 202, 194-198.

Burkarter et al. "Electrosprayed superhydrophobic PTFE: a non-contaminating surface" J. Phys. D: Appl. Phys. 2007, 40, 7778-7781.

Xiong et al. "Fabrication of Ultrafine Fibrous Polytetrafluoroethylene Porous Membrane by Electrospinning" J. Mater. Res. 2009, 24, 2755-2761.

International Search Report/Written Opinion for PCT application No. PCT/US2012/028503 dated Oct. 23, 2012.

International Preliminary Report on Patentability for PCT application No. PCT/US2012/028503 dated Sep. 10, 2013.

* cited by examiner

FIG. 1A (SIDE VIEW)

FIG. 1B (SIDE VIEW)

(TOP VIEW)

(SIDE VIEW)

US 10,087,554 B2

METHODS FOR THE PRODUCTION OF FLUOROPOLYMER FIBERS

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide a scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

Superhydrophobicity is an important property of a solid surface that can be demonstrated by a high water contact angle ("CA")>150°. Superhydrophobic surfaces, along with having low contact angle hysteresis, usually less than 10°, will additionally have self-cleaning properties. These surface properties provide potential for several applications, such as windshields for automobiles, self-cleaning window glass, icephobic surfaces, textiles, construction, paints, microfluidics, Li-air batteries, and solar cells to name a few. Superhydrophobicity has been achieved by either decorating the surface with nano-micro size features of low surface energy materials or by attempting to develop nanofiber mats or membranes composed of low surface energy materials. Various processes have been conducted to produce these surfaces such as etching, lithography, mechanical stretching, layer-by-layer techniques, phase separation, electrochemical deposition, chemical vapor deposition, and electrospinning.

In the case of fiber formation of fluoropolymers (excellent candidates to prepare a superhydrophobic surface due to their extremely low surface energies), there have been various attempts to develop fiber mats. Fluoropolymers are classified as "non-melt processable" and, given their extremely low dielectric constant, these materials have been complex to process. A steady process for the preparation of ultrafine fluoropolymers (such as pure Teflon AF fiber) through electrospinning or any other technique does not appear to have been documented. Several attempts have pursued and are explained below.

A single step process to produce micro and nanofibers from polymer that has extremely high melt viscosity, such as PTFE, was proposed through a single step solvent-free technique. A mixture of PTFE (PTFE 601A or 7A powder from DuPont) and high pressure gas such as nitrogen and argon (up to 40%) was blown through a heated (260 C to 360 C) stainless steel nozzle. The outcome of the process was a small amount of pure PTFE fibrous material where a minimal amount of fibers with diameters as low as 30-40 nm and lengths as high as 3-4 mm are observed immersed within other structures. The degree of fibrillation was higher in jet blown fibers processed at temperature above the melting point of the material (e.g., 350 C for PTFE 601A or 7A powder). The water contact angle of the produced fibers was observed to be 147°.

Electrospinning is a well-known technique to produce micro and nanofibers. The first attempt to electrospin PTFE was done by electrospinning an aqueous dispersion of PTFE in distilled water with a nonionic wetting agent and stabilizer. The electrospun material was deposited on a conducting fluorine doped tin oxide coated glass slide fixed to a hot plate at 150 C. The process resulted in spraying the material instead of forming continuous fibers. The electrosprayed PTFE material was further heated to remove water and wetting agent. The as-sprayed PTFE coating was hydrophilic due to the presence of wetting agent, which then was removed by heating at 265 C in air or 190 C in vacuum. After this process, the coating showed a water contact angle as high as 167 with drop sliding angle of 2.

In another method of forming fluoropolymer fibers, a blend of a sacrificial matrix and the desired fluoropolymer are used in an electrospinning process to produce mixed fibers. The sacrificial matrix is then removed, leaving fibers the are primarily composed of the fluoropolymer. For example, an emulsion blend of poly(vinyl alcohol) ("PVA") and PTFE in deionized water was electrospun. The PVA was removed by sintering the electrospun material resulting in fluoropolymer fibers. Electrospinning gave some fine fibers (300 nm) but mainly non-uniform fibers of PVA/PTFE at an emulsion mass ratio of 30:70. Increasing PVA content resulted in uniform fibers, but with a larger fiber diameter. DSC and ATR-FTIR studies before and after sintering confirmed complete removal of the sacrificial polymer, PVA, from the electrospun material. After sintering, however, the composite fibers were fused at the crossovers, forming a porous membrane. Generally fibers are not obtained as the ultimate material in such processes.

In another process, fluoropolymer fibers may be prepared by continuously coating an electrospinnable core polymeric material with the fluoropolymer. For example, a fluoropolymer (e.g., Teflon AF) may be continuously coated onto an electrospinnable polymer (e.g., poly($\varepsilon$-caprolactone, "PCL") that is used as a core material to form superhydrophobic coaxial fibers. Teflon AF 2400, 1 wt % in Fluorinert FC-75 solvent (400-S1-100-1 purchased from DuPont) was used as sheath material and PCL dissolved in 2,2,2-trifluoroethanol (TFE, 99.8% purity) solution was used as core material. Uniform coaxial fibers were formed with 10 wt % PCL core at 1.5 mL/hr and 1 wt % Teflon sheath at 1 ml/hr feed rate with diameter within ~1-2 µm. The coaxial PCL/Teflon AF fiber exhibited water contact angle of 158 and contact angle with dodecane of around 130 while the same value for PCL only fiber were 125 and 0, respectively. Other materials (e.g., poly(vinyledenefluoride) or poly(acrylonitrile)) may be used as a core material.

There are many problems with coaxial electrospinning methods. Coaxial electrospinning methods generally exhibit a lack of uniformity in the fibers observed. Additionally, the core does not always stay as the core and the sheath is generally not a uniform coating of the core material. Additionally, the process of forming coaxial fibers is complex and uses significant amounts of solvents. While some few attempts have been made to prepare pure fluoropolymer fibers, no attempts appear to be readily scaled up for commercial use given the above noted deficiencies.

SUMMARY OF THE INVENTION

A method of producing fibers, includes placing a composition that includes one or more fluoropolymers in the body of a fiber producing device. The fiber producing device includes a body having one or more openings and a coupling member. The body of the fiber producing device receives material to be produced into a fiber. The fiber producing device may be coupled to a driver by the coupling member. To produce fibers, the fiber producing device is rotated at a speed of at least about 500 rpm. Rotation of the fiber producing device causes the composition in the body to be passed through one or more openings to produce microfibers and/or nanofibers comprising one or more of the fluoropolymers. The produced microfibers and/or nanofibers may be collected and used for various applications. In contrast to other methods of forming microfibers and/or nanofibers comprising one or more of the fluoropolymers, the microfibers and/or nanofibers are created without subjecting the fibers, during their creation, to an externally applied electric field.

In some embodiments, one or more fluoropolymers are mixed with a solvent to produce the composition as a mixture of the one or more fluoropolymers in the solvent, and placing the composition in the fiber producing device. One or more of the fluoropolymers may be a polytetrafluoroethylene polymer. Fluoropolymers may be at least partially dissolved in a solvent (e.g., a fluorinated solvent).

The microfibers and/or nanofibers may be produced at room temperature. In contrast to other methods of forming fluoropolymer fibers, fibers may be formed from a composition that consists essentially of one or more fluoropolymers in a solvent (e.g., does not include a core or sacrificial polymer). Microfibers and/or nanofibers made from fluoropolymers may be used to form fabrics or as a hydrophobic coating.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1A depicts a top view of an embodiment of a fiber producing device that includes a single plate with multiple peripheral openings;

FIG. 1B depicts a side view of an embodiment of a fiber producing device that includes a single plate with multiple peripheral openings;

Figure 1C:
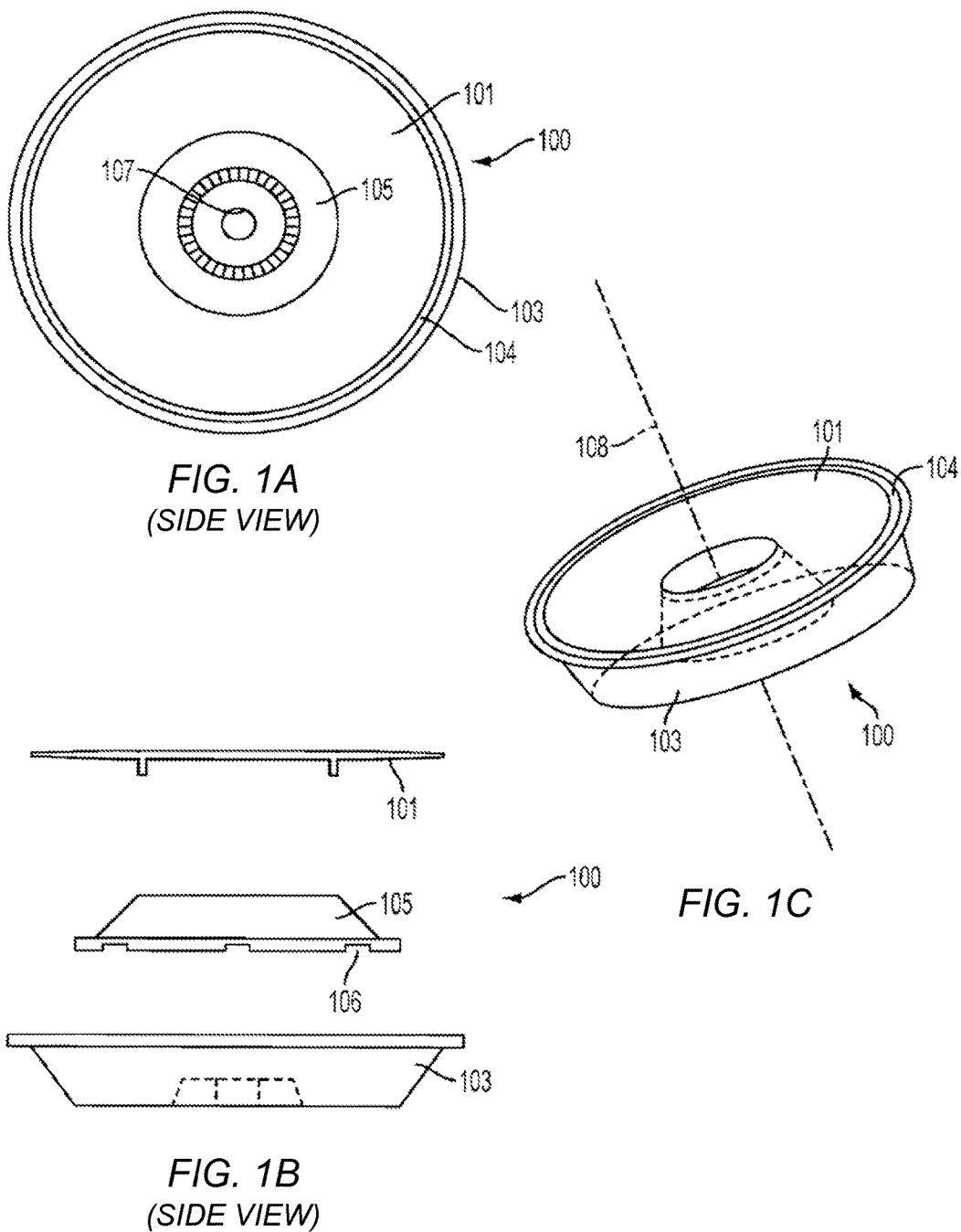
FIG. 1C depicts a projection view of an embodiment of a fiber producing device that includes a single plate with multiple peripheral openings.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fluoropolymer fibers, such as microfibers and nanofibers. The methods discussed herein employ centrifugal forces to produce fluoropolymers. Apparatuses that may be used to create fluoropolymer fibers are also described. Some details regarding creating fibers using centrifugal forces may be found in the following U.S. Published Patent Applications: 2009/0280325; 2009/0269429; 2009/0232920; and 2009/0280207, all of which are incorporated herein by reference.

One embodiment of a fiber producing device is shown in FIG. 1. Fiber producing device 100 includes a top plate 101 that is coupled to bottom plate 103. Bottom plate 103 acts as a reservoir in which material may be placed. A reservoir cover plate 105 may be put over the bottom plate 103 to control spillage and also to provide openings 106 for fluid to escape from the reservoir. Reservoir cover plate 105 has a circular opening to allow introduction of material to be spun. For this type of fiber producing device, typical amounts of material range from 50-100 mL, but amounts less than this may be used as well as amounts greater than this, as the size of the reservoir and the fiber producing device may each vary. Lining the perimeter of bottom plate 103 is a material exit path 104. While the fiber producing device is spinning, material will generally follow this path. Material exits the fiber producing device through one or more openings 106 and escapes the fiber producing device along path 104. Stated otherwise, top plate 101 and/or bottom plate 103 have one or more peripheral openings 106 around the perimeter of the reservoir, as shown. In some embodiments, the one or more peripheral openings 106 include a plurality of peripheral openings.

In an alternate embodiment, a peripheral gap may be present between top plate 101 and bottom plate 103, through which material in the bottom plate escapes. The size of the peripheral gap may be adjusted by changing the distance between top plate 101 and the bottom plate 103. In this way, as the fiber producing device 100 is rotated, the material can pass through the peripheral gap and travel along path 104, through which the material can exit the fiber producing device.

Hole 107 is configured to attach to a driver, such as through a universal threaded joint. Suitable drivers include commercially available variable electric motors, such as a brushless DC motor. The spin axis 108 of fiber producing device 100 extends centrally and vertically through the hole 107, perpendicular to the top plate 101. Fiber producing device 100 may be used for melt spinning or solution spinning. In certain embodiments, fiber producing device 100 is spun for 300-2,000 seconds to form microfibers and/or nanofibers. Fiber producing device 100 may also be operated in a continuous mode for longer amounts of time.

Fibers created using the fiber producing devices described herein may be collected using a variety of fiber collection devices. Various exemplary fiber collection devices are discussed below, and each of these devices may be combined with one another.

Figure 2:
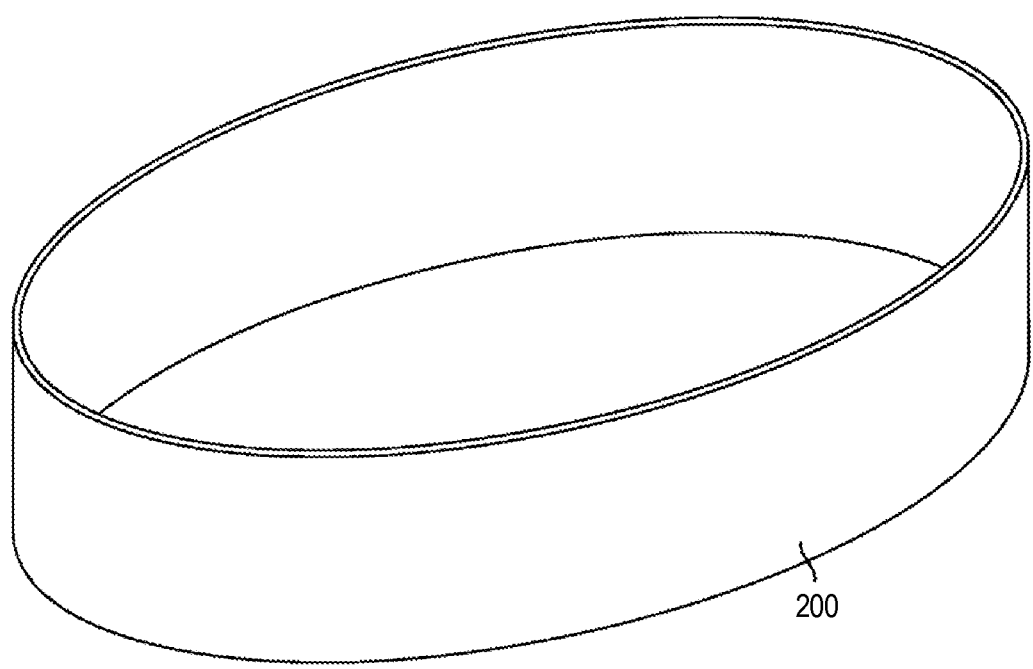
FIG. 2 depicts an embodiment of a fiber collection device.

The simplest method of fiber collection is to collect the fibers on the interior of a collection wall that surrounds a fiber producing device (see, e.g., collection wall 200 shown in FIG. 2). Fibers are typically collected from collection walls similar to collection wall 200 as unwoven fibers.

The aerodynamic flow within the chamber influences the design of the fiber collection device (e.g., height of a collection wall or rod; location of same). Aerodynamic flow may be analyzed by, for example, computer simulation, such as Computational Fluid Dynamics (CFD). The spinning fiber producing device develops an aerodynamic flow within the confinement of the apparatuses described herein. This flow may be influenced by, for example, the speed, size and shape of the fiber producing device as well as the location, shape, and size of the fiber collection device. An intermediate wall placed outside the collection wall may also influence aerodynamic flow. The intermediate wall may influence the aerodynamic flow by, for example, affecting the turbulence of the flow. Placement of an intermediate wall may be necessary in order to cause the fibers to collect on the fiber collection device. In certain embodiments, placement of an intermediate wall can be determined through experimentation. In an embodiment, a fiber producing device is operated in the presence of a fiber collection device and an intermediate wall, observing whether or not fibers are collected on the fiber collection device. If fibers are not adequately collected on the fiber collection device, the position of the intermediate wall is moved (e.g., making its diameter smaller or larger, or making the intermediate wall taller or shorter) and the experiment is performed again to see if adequate collection of fibers is achieved. Repetition of this process may occur until fibers are adequately collected on the fiber collection device.

A stagnation zone may develop at, for example, the site of the spinning fiber producing device (such as centered at the spinning fiber producing device). A fiber producing device is typically designed such that it does not disturb the stagnation zone. If a fiber producing device is not designed properly with respect to the stagnation zone, fibers are typically not formed to the desired specifications.

Typically, fibers are collected on a collection wall or settle onto other designed structure(s) of stagnation zone. Temperature also plays a role on the size and morphology of the formed fibers. If the collection wall, for example, is relatively hotter than the ambient temperature, fibers collected on the collection wall may coalesce, leading to bundling of and/or welding of individual fibers. In some embodiments, the temperature of the intermediate wall may be controlled, such as, for example, by blowing gas (e.g., air, nitrogen, argon, helium) between the intermediate wall and the collection wall. By controlling the flow rate, type, and temperature of this blowing gas, it is possible to control the temperature and morphology of the fibers. Wall parameters (e.g., height, location, etc.) may also influence the morphology of the fibers.

The intermediate wall may also be used to control, adjust, and/or influence the aerodynamic flow within the apparatus. Aerodynamic flow typically guides the fibers to rest on one or more fiber collection devices. If, upon formation, loose fibers float in an apparatus (due to their very small mass) without coming to rest on one or more fiber collection devices, it is likely that, for example, the intermediate wall is not positioned correctly, or the fiber collection device(s) is not correctly positioned, and/or the aerodynamic flow is not properly understood. An intermediate wall is typically taller than any collection wall that may be used (e.g., about 1.1 to about 3 times as high as the collection wall). The intermediate wall may surround a collection wall at a distance of from about 1 inch to about 5 inches, or from about 2 inches to about 4 inches, or about 3 inches. Intermediate wall may be about 10% to about 30% larger (e.g., 20% larger) than the collection wall. An intermediate wall may be segmented, and may have one or more holes in it.

Figure 3A:
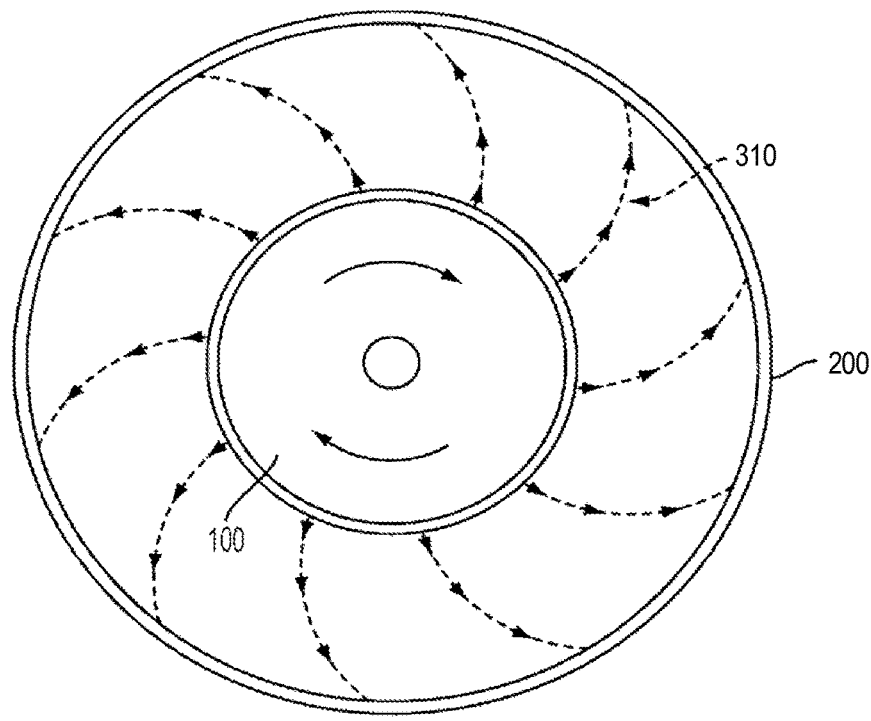
FIG. 3A shows a top view of a fiber producing device that includes a fiber producing device as depicted in FIG. 1 and a collection wall.
Figure 3B:
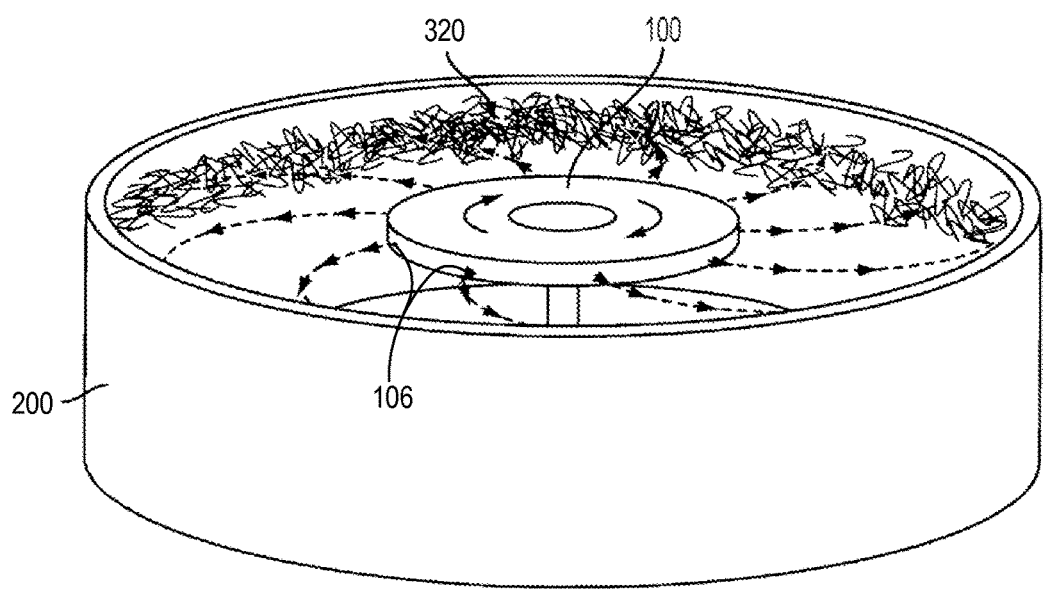
FIG. 3B shows a projection view of a fiber producing device that includes a fiber producing device as depicted in FIG. 1 and a collection wall.

FIG. 3A shows a top view of a fiber producing device that includes a fiber producing device as depicted in FIG. 1 and a collection wall 200. FIG. 3B shows a projection view of a fiber producing device that includes a fiber producing device as depicted in FIG. 1 and a collection wall 200. As depicted, fiber producing device 100 is spinning clockwise about a spin axis, and material is exiting openings 106 of the fiber producing device as fibers 320 along various pathways 310. The fibers are being collected on the interior of the surrounding collection wall 200.

Figure 4:
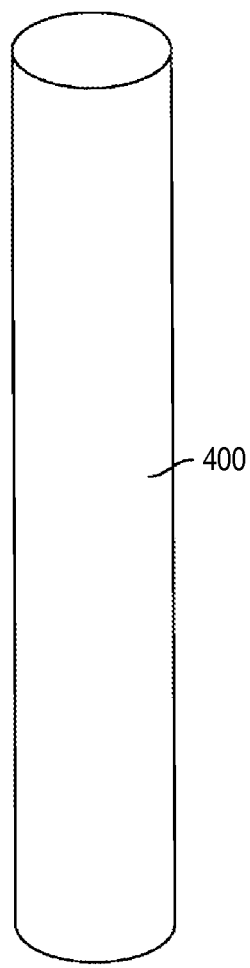
FIG. 4 depicts an embodiment of a fiber collection rod.

If the objective is to collect unidirectional and long fibers, a collection rod may be designed and positioned at an appropriate distance from the fiber producing device. An example of this is collection rod 400 as shown in FIG. 4. One or more collection rods (like rod 400) are typically placed at a distance of about 1 inch to about 10 inches, or about 5 inches to about 7 inches, or about 6 inches from the center of the fiber producing device. One or more collection rods may be positioned along the perimeter of the interior of a collection wall. A collection rod may be stationary during fiber collection, or it may be rotated during collection. Rods of this nature may be made from any suitable material that will give them significant rigidity, such as rigid polymers (e.g., polycarbonates) or metals (e.g., aluminum or stainless steel). In some embodiments where the collection rod or rods are to be rotated, the rods may be secured to a structure like a plate that is connected, along with the fiber producing device, to a driver. The rod-holding plate and fiber producing device may be geared to each other in a way that allows both to rotate in the same or opposite directions as a result of the rotation of a single driver. The diameter of a rod may be from about 0.1 inches to about 1 inch, or from about 0.2 inches to about 0.5 inches, or may be about 0.25 inches, but a variety of other sizes may be used, depending on the configuration of the fiber producing device. The rod may, for example, be rotated at a speed of about 50 to about 250 RPM. Collection rods may be used in combination with collection walls and intermediate walls to maximize collection of fibers.

Figure 5A:
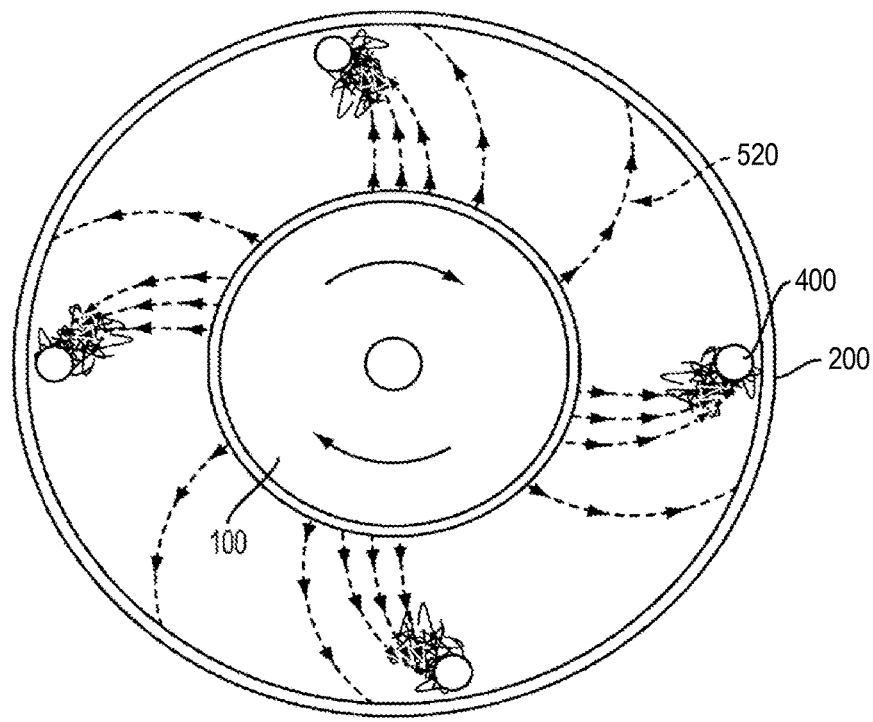
FIG. 5A shows a top view of a fiber producing device that includes a fiber producing device as depicted in FIG. 1, a collection wall, and collection rods.
Figure 5B:
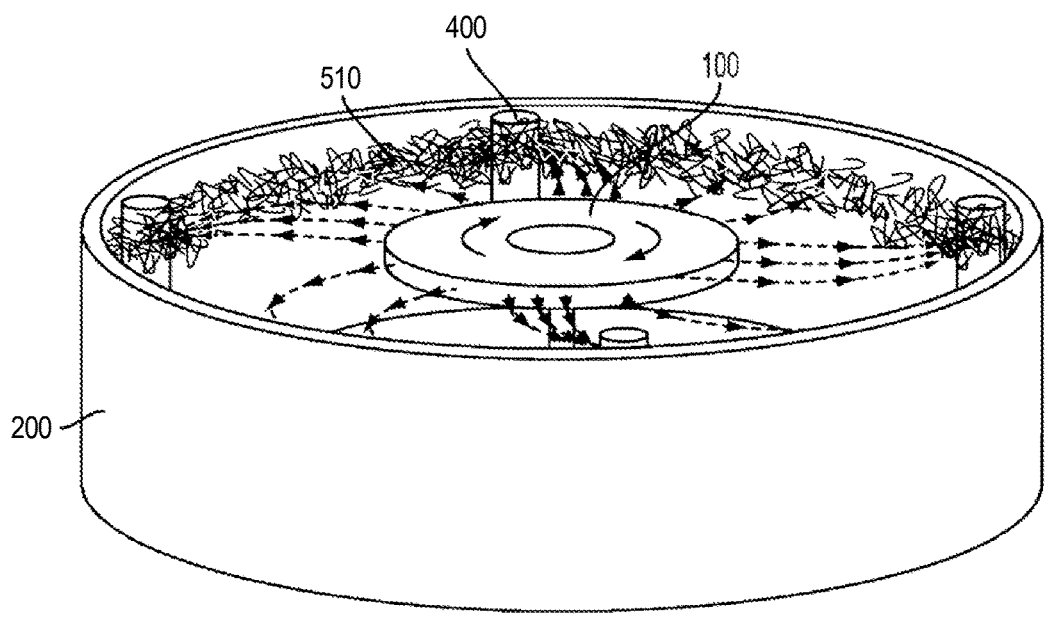
FIG. 5B shows a projection view of a fiber producing device that includes a fiber producing device as depicted in FIG. 1, a collection wall, and collection rods.

FIG. 5A shows a top view of a fiber producing device that includes a fiber producing device as depicted in FIG. 1, a collection wall, and collection rods. FIG. 5B shows a projection view of a fiber producing device that includes a fiber producing device as depicted in FIG. 1, a collection wall, and collection rods. As depicted, fiber producing device 100 is spinning clockwise about a spin axis, and material is exiting openings 106 of the fiber producing device as fibers 510 along various pathways 520. The fibers are being collected on the interior of the surrounding collection wall 200 and at collection rods 400.

The conditions of the environment in which fibers are created may influence various properties of those fibers. For example, some metallic fibers, such as iron fibers, react with ambient air (becoming converted to iron oxides). For such applications, it is preferable to replace ambient air with an inert gas (e.g., nitrogen, helium, argon). Humid conditions may detrimentally affect the surfaces of many polymeric fibers, such as poly(ethylene oxide) (PEO) fibers. Thus, lowering humidity levels is preferable for processing of some materials. Similarly, drugs may be required to be developed under sterile conditions that are not maintained in ambient conditions, a sterile environment is therefore preferred in such situations.

The "environment" refers to the interior space defined by the housing that surrounds the components of a fiber producing device. For certain uses, the environment may simply be ambient air. Air may be blown into the environment, if desired. For other uses, the environment may be subjected to low-pressure conditions, such as from about 1 mm Hg to about 760 mm Hg, or any range derivable therein using, for example, a vacuum pump. Alternatively, the environment may be subjected to high-pressure conditions, such as conditions ranging from 761 mm Hg up to 4 atm or higher using, for example, a high pressure pump. The temperature of the environment may be lowered or raised, as desired, through the use of heating and/or cooling systems, which are described below. The humidity level of the environment may be altered using a humidifier, and may range from 0% to 100% humidity. For certain applications, such as drug development, the environment may be rendered sterile. If the components of an apparatus are each made of, for example, stainless steel, all components may be individually sterilized and assembled, such as in a clean room under conditions that maintain the sterility of the apparatus.

Several types of heating and cooling sources may be used in apparatuses and methods as discussed herein to independently control the temperature of, for example, a fiber producing device, a collection wall, an intermediate wall, a material, and/or the environment within an apparatus. Examples of heat sources that may be employed include resistance heaters, inductive heaters and IR (Infra Red) heaters. Peltier or Thermoelectric Cooling (TEC) devices may be used for heating and/or cooling purposes. Cold gas or heated gas (e.g., air or nitrogen) may also be pumped into the environment for cooling or heating purposes. Conductive, convective, or radiation heat transfer mechanisms may be used for heating and cooling of various components of the apparatuses.

Figure 6A:
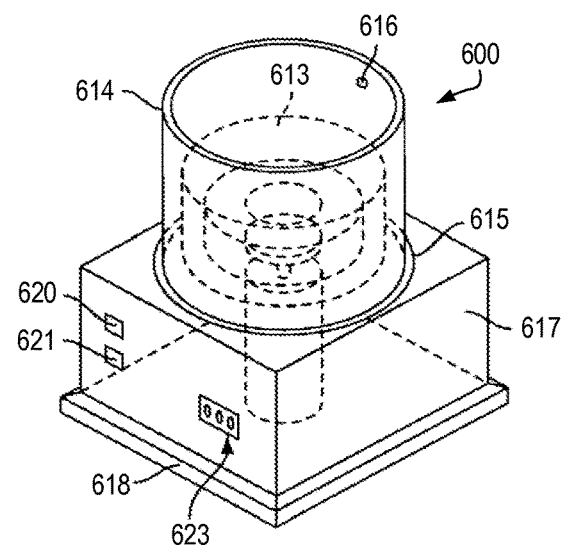
FIG. 6A shows a partially cut-away perspective view of an embodiment of a fiber producing system.
Figure 6B:
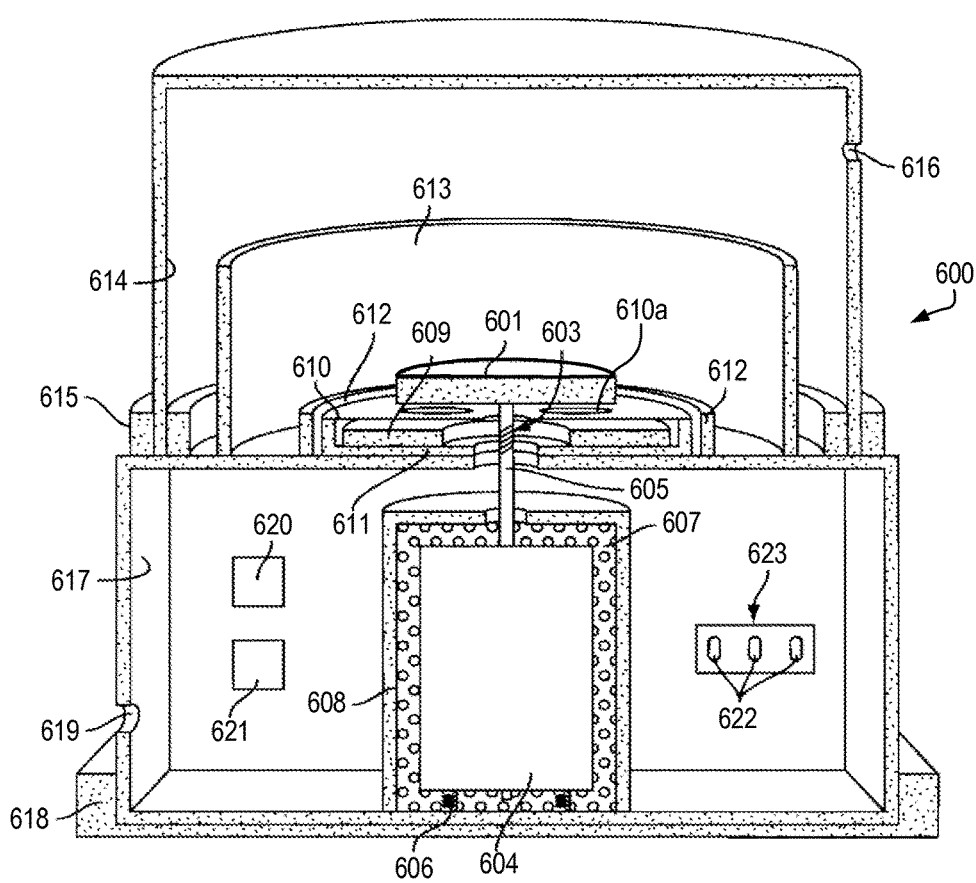
FIG. 6B depicts a cross-sectional view of a fiber producing system.

FIG. 6A shows a partially cut-away perspective view of an embodiment of a fiber producing system 600. FIG. 6B depicts a cross-sectional view of fiber producing system 600. System 600 includes fiber producing device 601, which has peripheral openings as depicted, for example, in FIG. 1, and is coupled to a threaded joint 603, such as a universal threaded joint, which, in turn, is coupled to a motor 604 via a shaft 605. Motor 604, such as a variable speed motor, is supported by support springs 606 and is surrounded by vibration insulation 607 (e.g., high-frequency vibration insulation). A motor housing 608 encases the motor 604, support springs 606 and vibration insulation 607. A heating unit 609 is enclosed within enclosure 610 (e.g., a heat reflector wall) that has openings 610a that direct heat (thermal energy) to fiber producing device 601. In the embodiment shown, heating unit 609 is disposed on thermal insulation 611. Surrounding the enclosure 610 is a collection wall 612, which, in turn, is surrounded by an intermediate wall 613. A housing 614 seated upon a seal 615 encases fiber producing device 601, heating enclosure 610, collection wall 612 and intermediate wall 613. An opening 616 in the housing 614 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 617 which is supported by a base 618. An opening 619 in the wall 617 allows for further control of the conditions of the internal environment of the apparatus. Indicators for power 620 and electronics 621 are positioned on the exterior of the wall 617 as are control switches 622 and a control box 623.

A control system of an apparatus 622 allows a user to change certain parameters (e.g., RPM, temperature, and environment) to influence fiber properties. One parameter may be changed while other parameters are held constant, if desired. One or more control boxes in an apparatus may provide various controls for these parameters, or certain parameters may be controlled via other means (e.g., manual opening of a valve attached to a housing to allow a gas to pass through the housing and into the environment of an apparatus). It should be noted that the control system may be integral to the apparatus (as shown in FIGS. 6A and 6B) or may be separate from the apparatus. For example, a control system may be modular with suitable electrical connections to the apparatus.

Components of apparatuses may be made from a variety of materials. In certain embodiments, the components of an apparatus may be made from stainless steel. For example, the fiber producing device, collection wall and housing may each be made from stainless steel. In this situation, the components may be used for, e.g., low melting metals like tin (232° C.), zinc (420° C.), silver (962° C.) and alloys thereof. In certain embodiments, ceramic components may be used for high melting alloys, such as gold (1064° C.) and nickel (1453° C.). Manipulation of high melting alloys may require blanketing the environment of the components with an inert gas, such as nitrogen or helium, with appropriate sealing of the housing.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e.g., thinner), may also impact strain rate. Strain rates may be controlled by a variable speed fiber producing device. Strain rates applied to a material may be varied by, for example, as much as 50-fold (e.g., 500 RPM to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For solution spinning, ambient temperatures of the fiber producing device are typically used. In drug development studies the fiber producing device temperature range may be between, for example, 4° C. and 80° C. When producing ceramic or metal fibers, the temperatures utilized may be significantly higher. For higher temperatures, it will typically be necessary to make appropriate changes in the materials of the housing of an apparatus and/or the interior components (e.g., substitution of metal for plastic), or in the apparatus itself (e.g., addition of insulation). Such changes may also help avoid undesirable reactions, such as oxidation.

An example of how the variables discussed herein may be controlled and manipulated to create particular fibers regards drug development. Solubility and stability of drugs are two key considerations in developing drug delivery systems. Both of these parameters may be simultaneously controlled using the methods and apparatuses described herein. Solubility of the drug is often significantly improved by controlling its size: that is, the smaller the size, the better the solubility. For example, micron-sized fibers of optically active beta-lactams may be developed from their crystals (see, e.g., Example 5). At this significantly reduced size, the solubility of the drug in water is expected to show significant improvement over larger sized drug particles due to the higher surface area. Additionally, one may dissolve a drug in an appropriate solvent that then evaporates, leaving behind a fiber composed of the drug. One may also use the methods and apparatuses discussed herein to encapsulate such a drug in a material which is also spun, thereby forming a drug-encapsulated fiber. To facilitate the stability of certain drugs, it may often be necessary to lower the temperature of the environment below ambient conditions. Since the housing of an apparatus may be designed with adequate insulation, temperatures may be lowered as needed, such as −10° C. or below.

Figure 7A:
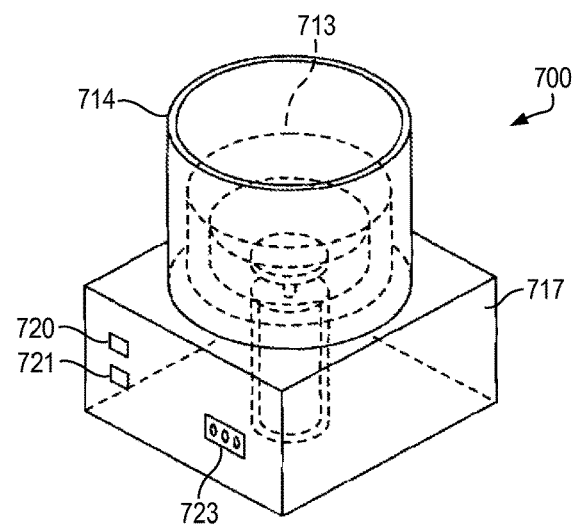
FIG. 7A shows a partially cut-away perspective view of an embodiment of a sealed fiber producing system.
Figure 7B:
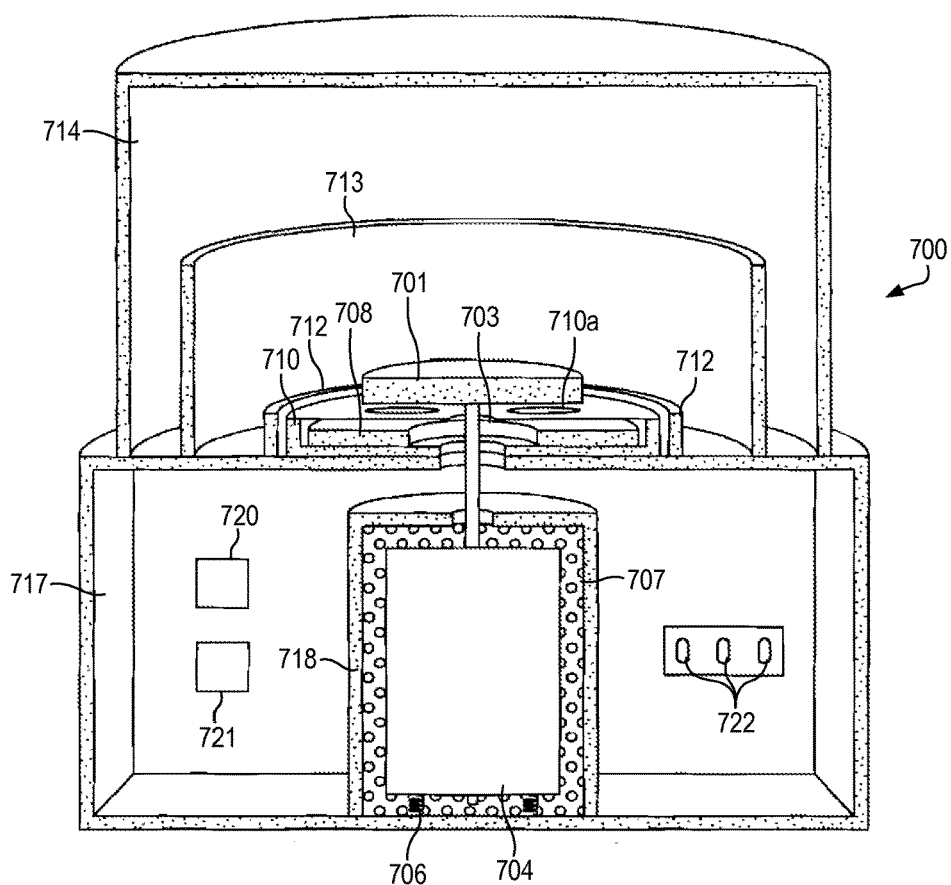
FIG. 7B depicts a cross-sectional view of a sealed fiber producing system.

A partially cut-away perspective view of an alternate embodiment of a fiber producing system 700 is shown in FIG. 7A. FIG. 7B depicts a cross-sectional view of fiber producing system 700. System 700 includes fiber producing device 701, which has peripheral openings as depicted, for example, in FIG. 1, and is coupled to a threaded joint 703, such as a universal threaded joint, which, in turn, is coupled to a motor 704 via a shaft 705. Motor 704, such as a variable speed motor, is supported by support springs 706 and is surrounded by vibration insulation 707. A motor housing 708 encases the motor 704, support springs 706 and vibration insulation 707 (e.g., high-frequency vibration insulation). A heating unit 709 is enclosed within enclosure 710 (e.g., a heat reflector wall) that has openings 710a that direct heat (thermal energy) to fiber producing device 701. In the embodiment shown, heating unit 709 is disposed on thermal insulation 711. Surrounding the enclosure 710 is a collection wall 712, which, in turn, is surrounded by an intermediate wall 713. A housing 714 encases fiber producing device 701, heating enclosure 710, collection wall 712 and intermediate wall 713. The lower half of the system is encased by a wall 717. Indicators for power 720 and electronics 721 are positioned on the exterior of the wall 717 as are control switches 722 and a control box 723.

Figure 8A:
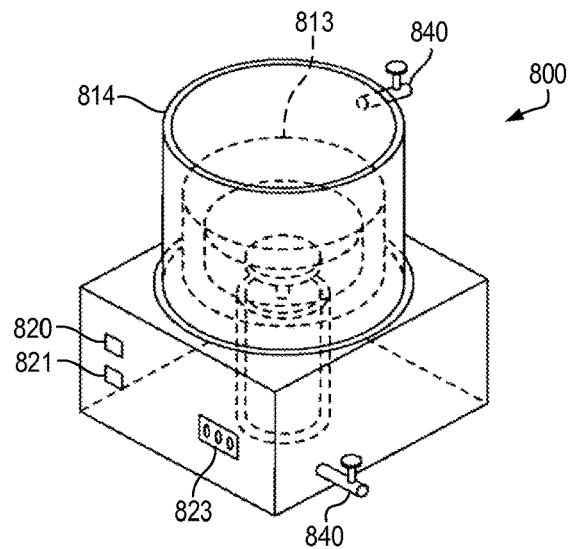
FIG. 8A shows a partially cut-away perspective view of an embodiment of a fiber producing system having valves positioned in inlet/outlet openings.
Figure 8B:
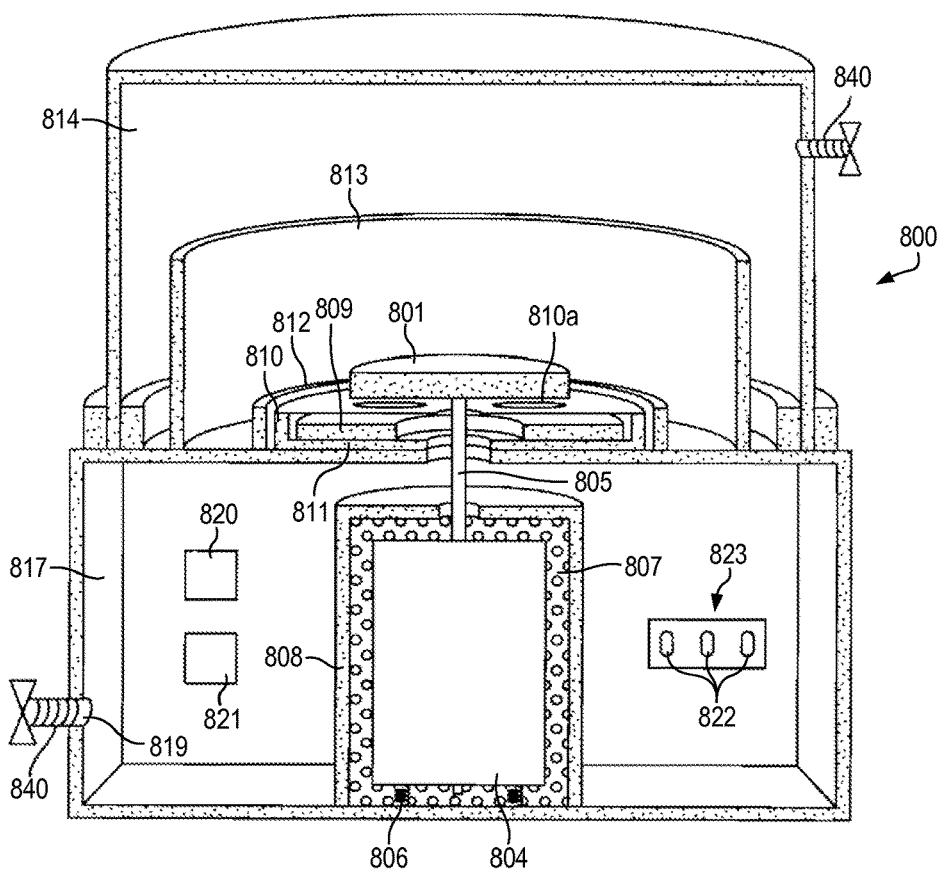
FIG. 8B depicts a cross-sectional view of a fiber producing system having valves positioned in inlet/outlet openings.

A partially cut-away perspective view of an alternate embodiment of a fiber producing system 800 is shown in FIG. 8A. FIG. 8B depicts a cross-sectional view of fiber producing system 800. System 800 includes fiber producing device 801, which has peripheral openings as depicted, for example, in FIG. 1, and is coupled to a threaded joint 803, such as a universal threaded joint, which, in turn, is coupled to a motor 804 via a shaft 805. Motor 804, such as a variable speed motor, is supported by support springs 806 and is surrounded by vibration insulation 807. A motor housing 808 encases the motor 804, support springs 806 and vibration insulation 807 (e.g., high-frequency vibration insulation). A heating unit 809 is enclosed within enclosure 810 (e.g., a heat reflector wall) that has openings 810a that direct heat (thermal energy) to fiber producing device 801. In the embodiment shown, heating unit 809 is disposed on thermal insulation 811. Surrounding the enclosure 810 is a collection wall 812, which, in turn, is surrounded by an intermediate wall 813. A housing 814 encases fiber producing device 801, heating enclosure 810, collection wall 812 and intermediate wall 813. An opening 816 in the housing 814 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 817. An opening 819 in the wall 817 allows for further control of the conditions of the internal environment of the apparatus. Valves 830 are shown occupying the openings 816 and 819. Valves 830 allow for controlled introduction and ejection of fluids (e.g., gasses) into and out of the interior environment of the apparatus. Indicators for power 820 and electronics 821 are positioned on the exterior of the wall 817 as are control switches 822 and a control box 823.

Figure 9A:
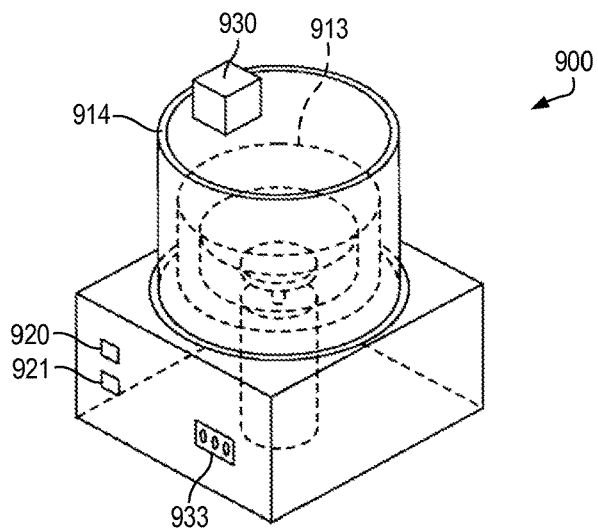
FIG. 9A shows a partially cut-away perspective view of an embodiment of a fiber producing system having valves that includes a thermoelectric cooler.
Figure 9B:
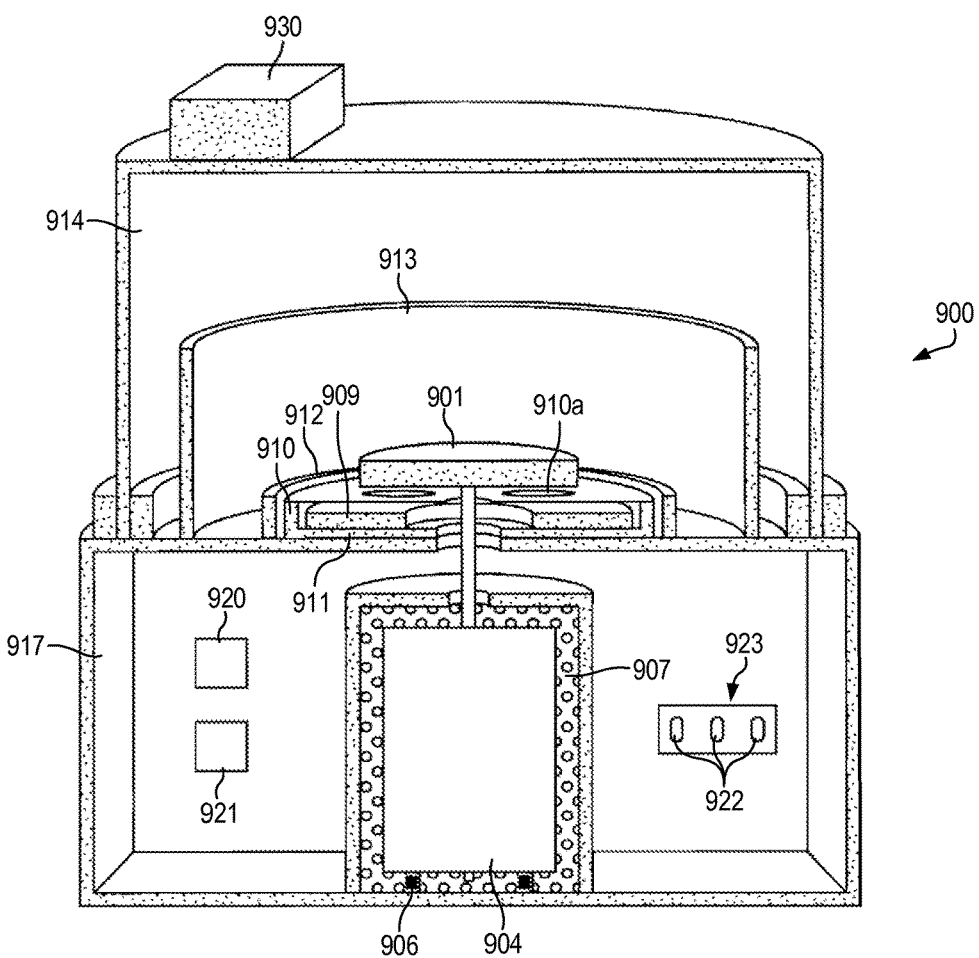
FIG. 9B depicts a cross-sectional view of a fiber producing system having valves that includes a thermoelectric cooler.

A partially cut-away perspective view of an alternate embodiment of a fiber producing system 900 is shown in FIG. 9A. FIG. 9B depicts a cross-sectional view of a fiber producing system 900. System 900 includes fiber producing device 901, which has peripheral openings as depicted, for example, in FIG. 1, and is coupled to a threaded joint 903, such as a universal threaded joint, which, in turn, is coupled to a motor 904 via a shaft 905. Motor 904, such as a variable speed motor, is supported by support springs 906 and is surrounded by vibration insulation 907. A motor housing 908 encases the motor 904, support springs 906 and vibration insulation 907 (e.g., high-frequency vibration insulation). A heating unit 909 is enclosed within enclosure 910 (e.g., a heat reflector wall) that has openings 910a that direct heat (thermal energy) to fiber producing device 901. In the embodiment shown, heating unit 909 is disposed on thermal insulation 911. System 900 also includes a cooling system 930 that may cool the interior environment of the apparatus. In an embodiment, cooling system 930 is a thermoelectric cooling system. Surrounding the enclosure 910 is a collection wall 912, which, in turn, is surrounded by an intermediate wall 913. A housing 914 encases fiber producing device 901, heating enclosure 910, collection wall 912 and intermediate wall 913. Cooling system 930 is coupled to housing 914 and may be used to cool the interior of the housing. The lower half of the system is encased by a wall 917. Indicators for power 920 and electronics 921 are positioned on the exterior of the wall 917 as are control switches 922 and a control box 923.

Figure 10A:
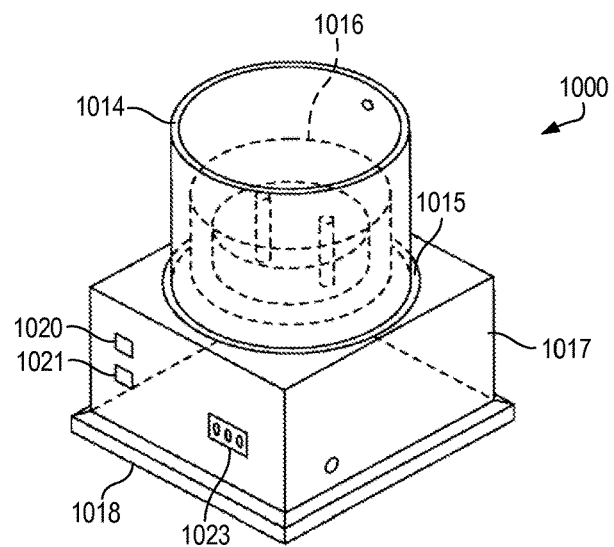
FIG. 10A shows a partially cut-away perspective view of an embodiment of a fiber producing system having collection devices.
Figure 10B:
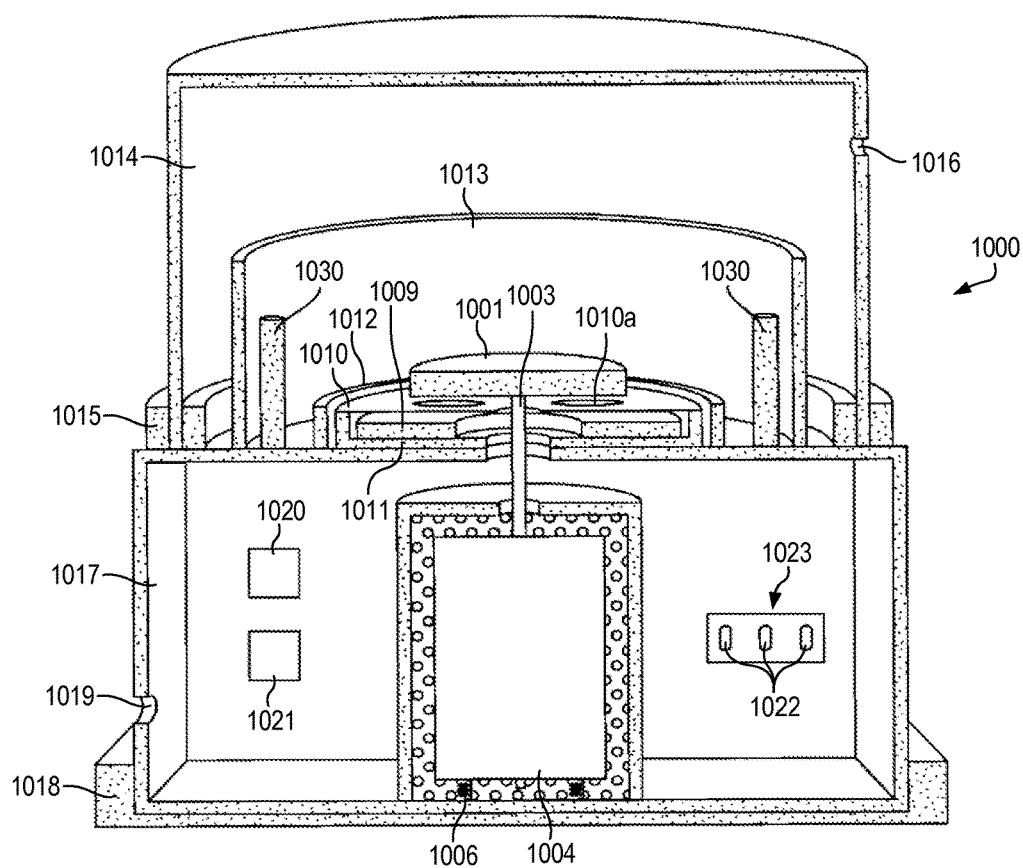
FIG. 10B depicts a cross-sectional view of a fiber producing system having collection devices.

FIG. 10A shows a partially cut-away perspective view of an embodiment of a fiber producing system 1000. FIG. 10B depicts a cross-sectional view of fiber producing system 1000. System 1000 includes fiber producing device 1001, which has peripheral openings as depicted, for example, in FIG. 1, and is coupled to motor 1004 via a shaft 1005. Motor 1004, such as a variable speed motor, is supported by support springs 1006 and is surrounded by vibration insulation 1007 (e.g., high-frequency vibration insulation). A motor housing 1008 encases the motor 1004, support springs 1006 and vibration insulation 1007. A heating unit 1009 is enclosed within enclosure 1010 (e.g., a heat reflector wall) that has openings 1010a that direct heat (thermal energy) to fiber producing device 1001. In the embodiment shown, heating unit 1009 is disposed on thermal insulation 1011. Surrounding the enclosure 1010 is a collection wall 1012, which, in turn, is surrounded by an intermediate wall 1013. A housing 1014 seated upon a seal 1015 encases fiber producing device 1001, heating enclosure 1010, collection wall 1012 and intermediate wall 1013. An opening 1016 in the housing 1014 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 1017 which is supported by a base 1018. An opening 1019 in the wall 1017 allows for further control of the conditions of the internal environment of the apparatus. Indicators for power 1020 and electronics 1021 are positioned on the exterior of the wall 1017 as are control switches 1022 and a control box 1023. System 1000 also includes one or more collection rods 1030. Collection rods may be used in conjunction with a collection wall to collect fibers, or each type of collection device may be used separately, depending on the type of fibers that are being collected.

Figure 11A:
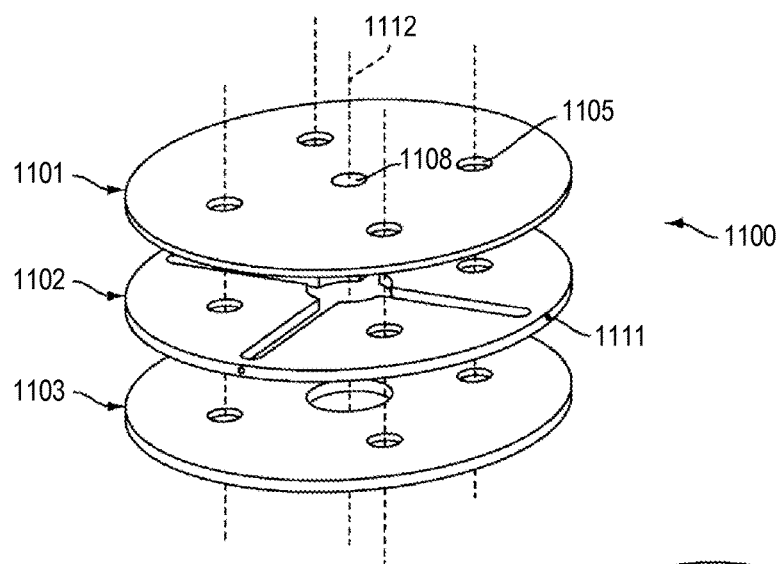
FIG. 11A depicts a projection view of an embodiment of a fiber producing device that includes three plates with multiple peripheral openings.
Figure 11B:
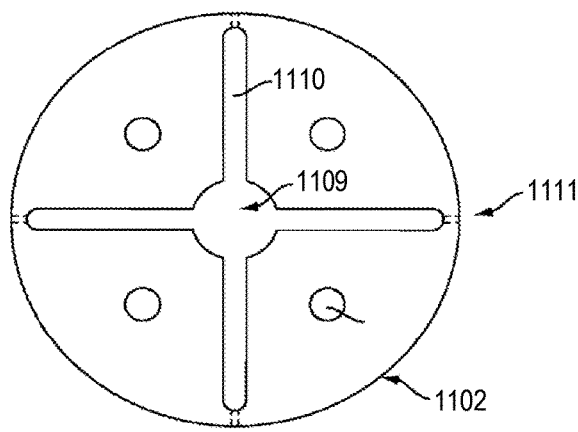
FIG. 11B depicts a top view of an embodiment of a fiber producing device that includes three plates with multiple peripheral openings.
Figure 11C:
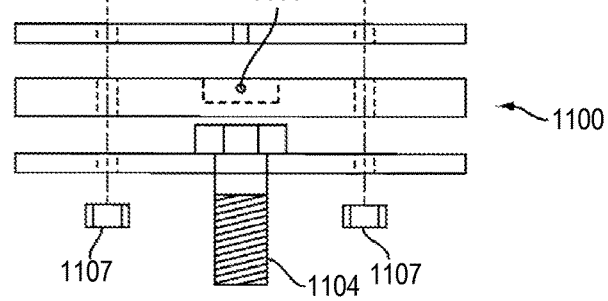
FIG. 11C depicts a side view of an embodiment of a fiber producing device that includes three plates with multiple peripheral openings.

Alternate embodiments of fiber producing devices may be used to produce fibers. For example, another embodiment of a fiber producing device 1100 is depicted in FIGS. 11A-11C. Fiber producing device 1100 includes a cover plate 1101, a base plate 1102, and a holding plate 1103, the latter of which is shown threaded with a holding plate screw 1104. The cover plate features holes 1105 through which plate securing screws 1106 may be employed to secure the three plates together along with the plate securing nuts 1107. The cover plate also features a material injection inlet 1108. A reservoir 1109 in the base plate 1102 for holding material is joined to multiple channels 1110 such that material held in the reservoir 1109 may exit the fiber producing device through the openings 1111. For this type of fiber producing device, typical amounts of material range from about 5 mL to about 100 mL, but amounts less than this may be used as well as amounts greater than this, as the size of the reservoir and the fiber producing device may each vary. The spin axis 1112 of fiber producing device 1100 extends centrally and vertically through the reservoir 1109, perpendicular to each of the three plates 1101, 1102 and 1103. In certain embodiments, a fiber producing device of this type is spun for about 10 seconds to about 500 seconds to form fibers. This type of fiber producing device may also be operated in a continuous mode for longer amounts of time.

Figure 12A:
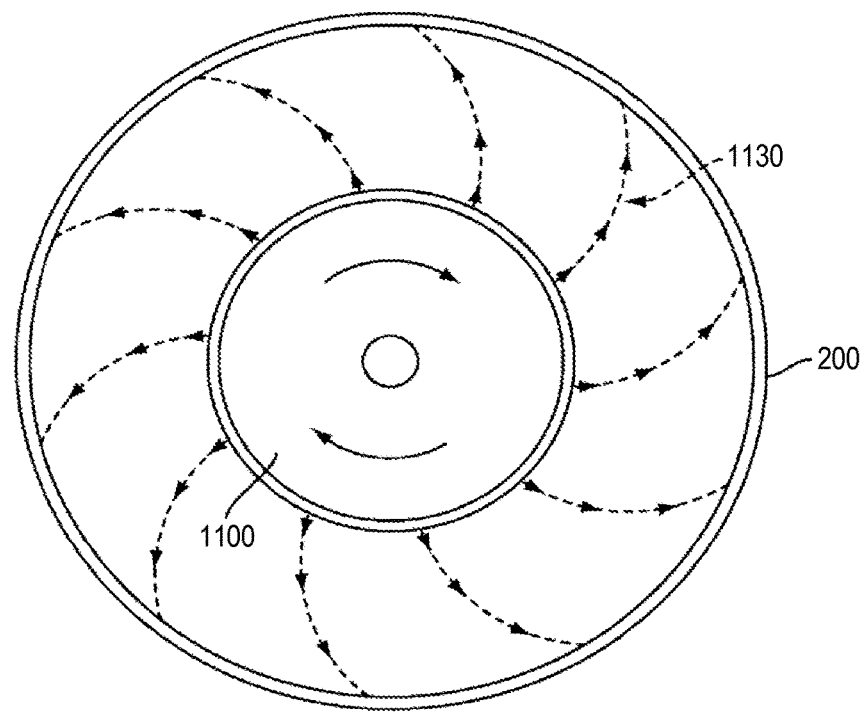
FIG. 12A shows a top view of a fiber producing device that includes a fiber producing device as depicted in FIG. 11 and a collection wall.
Figure 12B:
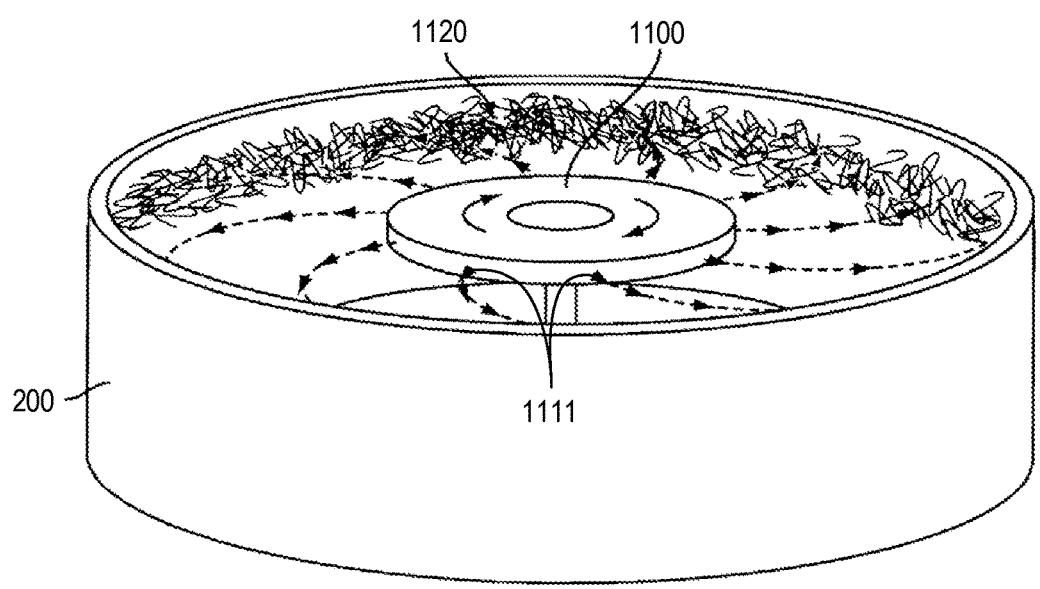
FIG. 12B shows a projection view of a fiber producing device that includes a fiber producing device as depicted in FIG. 11 and a collection wall.

FIG. 12A shows a top view of a fiber producing device that includes a fiber producing device as depicted in FIG. 11 and a collection wall 200. FIG. 12B shows a projection view of a fiber producing device that includes a fiber producing device as depicted in FIG. 11 and a collection wall 200. As depicted, fiber producing device 1100 is spinning clockwise about a spin axis, and material is exiting openings 1111 of the fiber producing device as fibers 1120 along various pathways 1130. The fibers are being collected on the interior of the surrounding collection wall 200.

Figure 13:
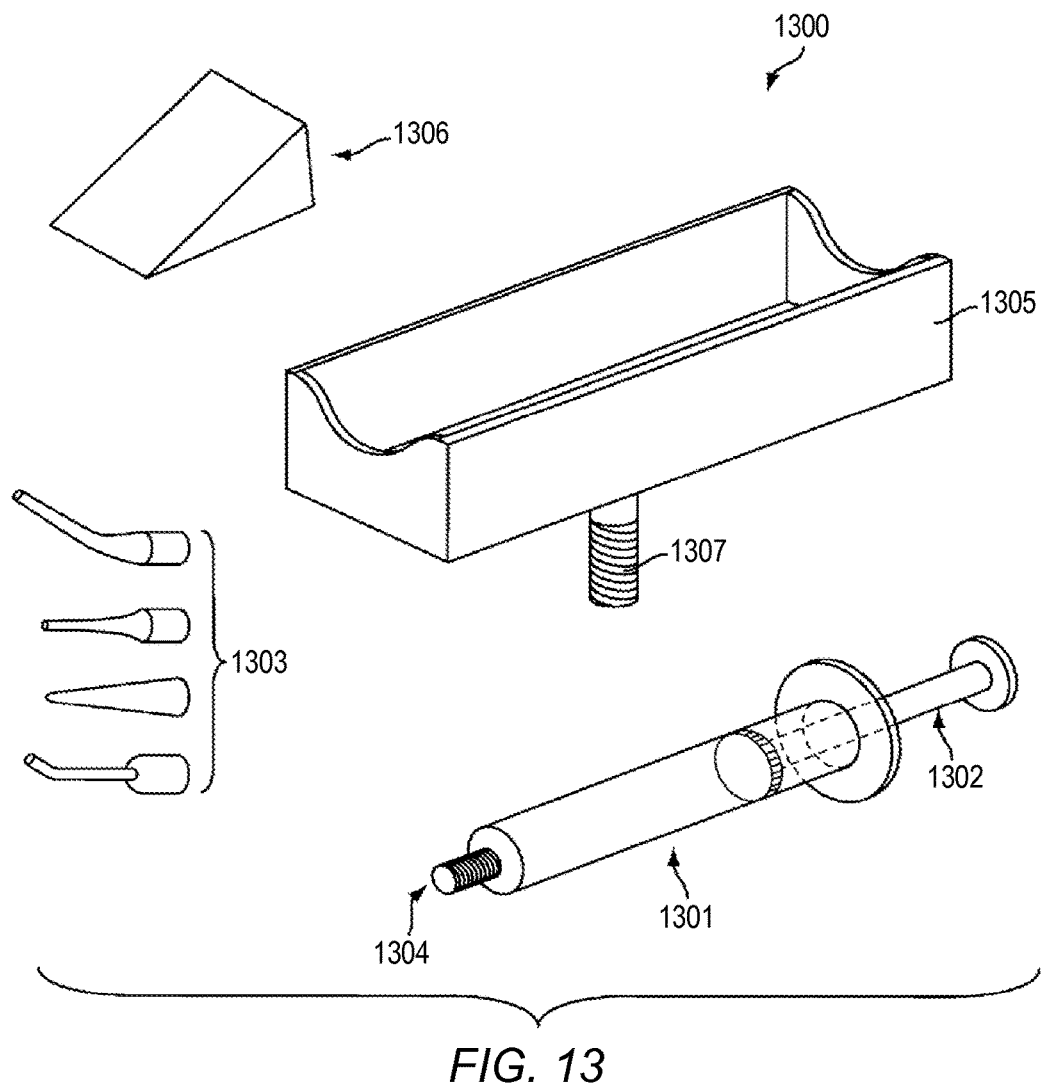
FIG. 13 depicts an embodiment of a fiber producing device that includes a syringe, plunger and various needles as well as a syringe support device.

FIG. 13 shows another embodiment of a fiber producing device. Fiber producing device 1300 includes a syringe 1301 equipped with a plunger 1302 and a variety of needles 1303 that may optionally be coupled to the syringe 1301 at the opening 1304. The syringe 1301 may be placed atop a syringe support device 1305. The syringe support device 1305 may also serve as a fiber collection device, as discussed herein. The wedge 1306 may optionally be positioned between the syringe 1301 and the syringe support device 1305 in order to alter the angle at which the material is ejected from the syringe 1301. A threaded joint 1307, such as a universal threaded joint, is shown attached to the syringe support device 1305.

Figure 14A:
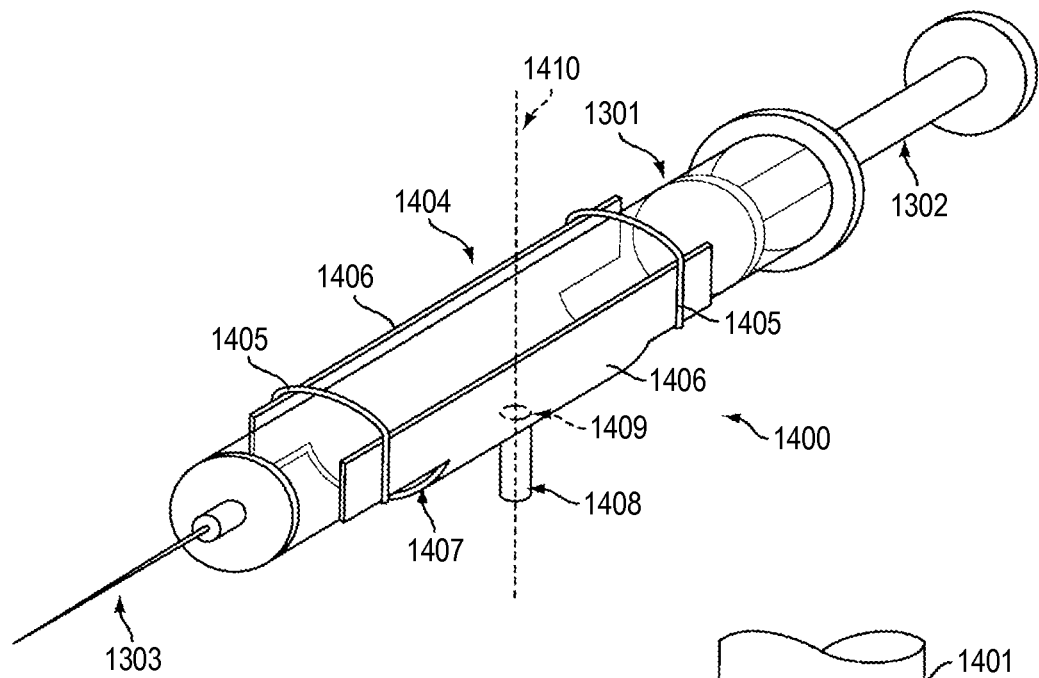
FIG. 14A depicts a projection view of an embodiment of a fiber producing device that includes a syringe secured to a syringe support device, where the syringe is equipped with a needle and a plunger.
Figure 14B:
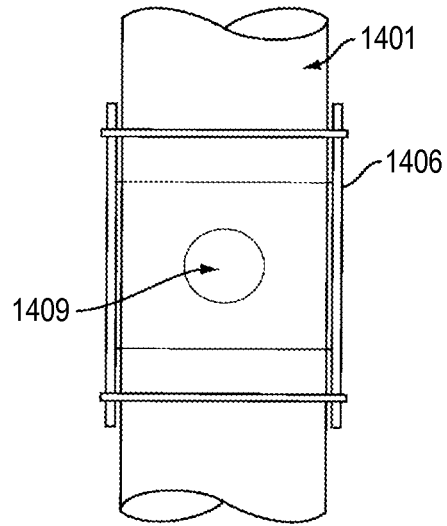
FIG. 14B depicts a bottom view of an embodiment of a fiber producing device that includes a syringe secured to a syringe support device, where the syringe is equipped with a needle and a plunger.
Figure 15A:
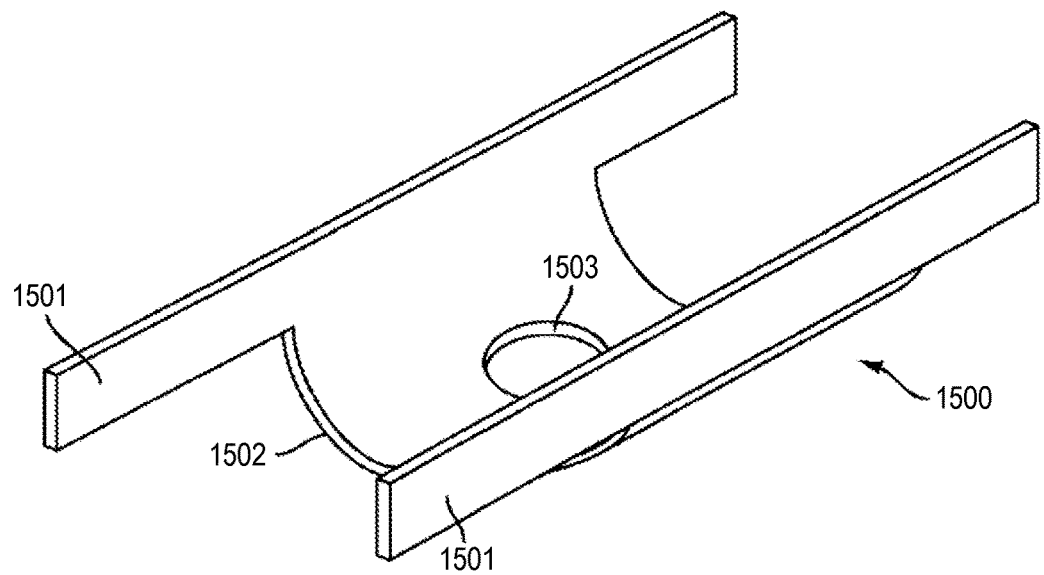
FIG. 15A depicts a projection view of an embodiment of a syringe support device.
Figure 15B:
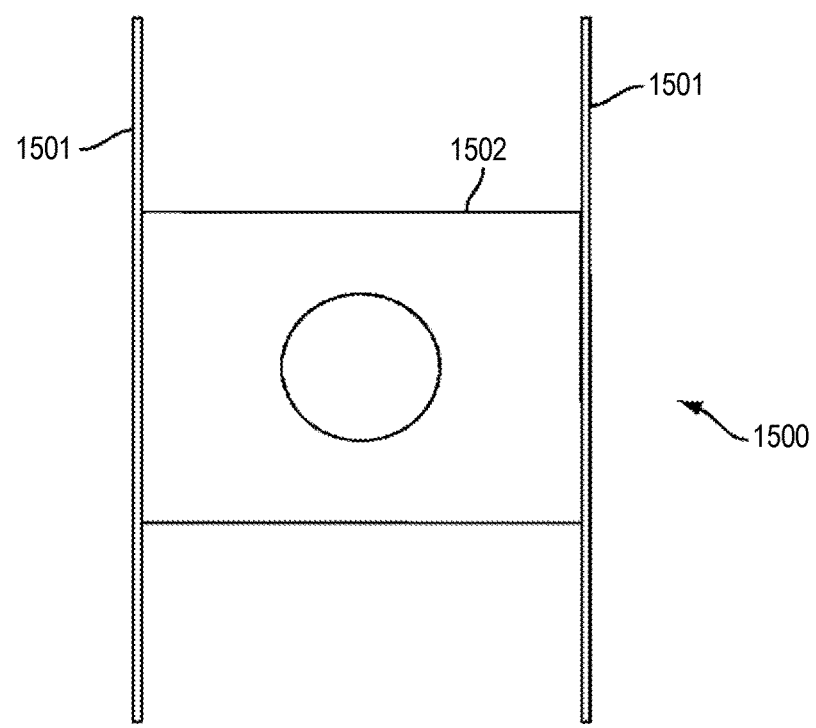
FIG. 15B depicts a bottom view of an embodiment of a syringe support device.

FIG. 14A depicts a projection view of an embodiment of a fiber producing device that includes a syringe secured to a syringe support device, where the syringe is equipped with a needle and a plunger. FIG. 14B depicts a bottom view of an embodiment of a fiber producing device that includes a syringe secured to a syringe support device, where the syringe is equipped with a needle and a plunger. Fiber producing device 1400 includes a syringe 1301 equipped with a plunger 1302 and a needle 1303 is secured to a syringe support device 1404 using two clamps 1405. Typically, about 10 mL to about 500 mL of material is placed in the syringe, but this amount may vary depending on the size of syringe. The syringe support device includes two walls 1406 and a base 1407. The walls 1406 may be straight or cylindrical (curved). Fibers may collect on the exterior of walls 1406 as they exit fiber producing device 1400, thus this syringe support device may also act as a fiber collection device. A threaded joint 1408, such as a universal threaded joint, is shown attached to the syringe support device 1404 at the hole 1409. The spin axis 1410 of this fiber producing device extends centrally and vertically through the hole 1409. This fiber producing device may be used for solution spinning. In certain embodiments, a fiber producing device of this type is spun for about 30 seconds to about 1,000 seconds to form fibers. Fiber producing device 1400 may also be operated in a continuous mode for longer amounts of time.

An alternate syringe support device 1500 that may also act as a fiber collection device is shown in FIGS. 5A and 5B. Syringe support device 1500 includes two walls 1501 and a base 1502 onto which a syringe may be placed. Walls 1501 may be cylindrical (curved). Base 1502 includes a hole 1503 and is configured to attach to a driver, such as through a universal threaded joint. Fibers may collect on the exterior of walls 1501 as they exit a syringe coupled to syringe support device, thus the walls act as a fiber collection device.

Figure 16:
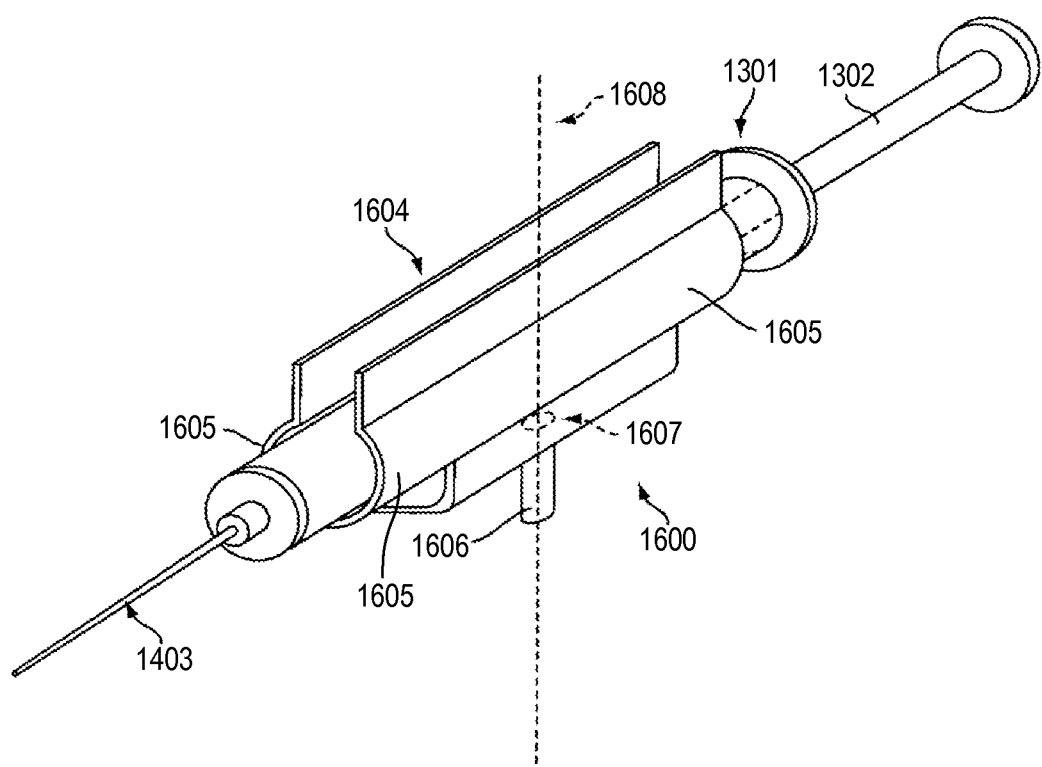
FIG. 16 depicts an embodiment that includes a syringe secured to a syringe support device, where the syringe is equipped with a needle and a plunger.

FIG. 16 shows fiber producing device 1600, which includes a syringe 1301 equipped with a plunger 1302 and a needle 1403. Syringe 1301 may be held by syringe support device 1604 through tension between opposing cylindrical walls 1605. Non-limiting mechanisms for attachment may include a snap fit or an adhesive joint. The syringe support device 1604 may also act as a fiber collection device by collecting fibers as they exit fiber producing device 1600, such as on the exterior of walls 1605. A threaded joint 1606, such as a universal threaded joint, is shown attached to the syringe support device 1604 at the hole 1607. The spin axis 1608 of this fiber producing device extends centrally and vertically through the hole 1607. Fiber producing device 1600 may be used for solution spinning. Typically, about 10 mL to about 500 mL of material are placed in the syringe, but this amount may vary depending on the size of syringe. In certain embodiments, fiber producing device 1600 is spun for about 10 seconds to about 1,000 seconds to form fibers. This fiber producing device may also be operated in a continuous mode for longer amounts of time.

Figure 24:
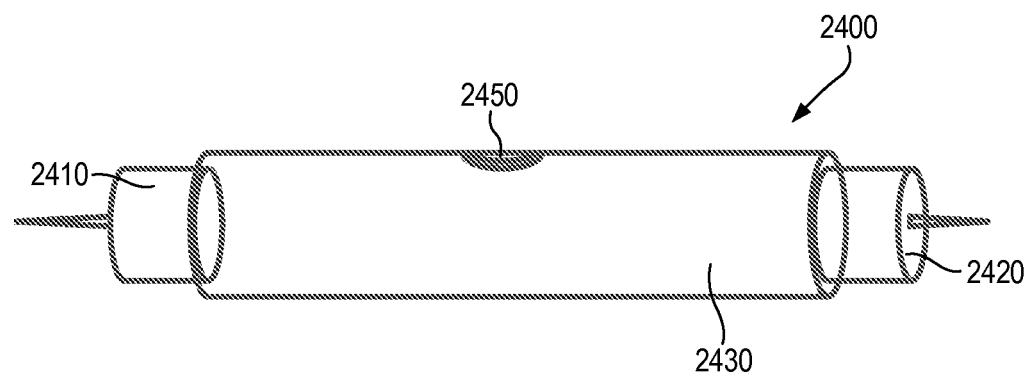
FIG. 24 depicts an alternate version of a syringe based fiber producing device.

FIG. 24 depicts an alternate embodiment of a syringe based fiber producing device. Syringe based fiber producing device 2400 includes a first syringe coupling 2410 and a second syringe coupling 2420 coupled to body 2430. Both first syringe coupling 2410 and second syringe coupling 2420 include respective connectors for removably coupling a needle to the body 2430. Body 2430 includes opening 2450 through which material to be spun may be introduced into body 2430. Syringe based fiber producing device 2400 may be held in a syringe support as described in any of FIGS. 13-17.

Figure 25:
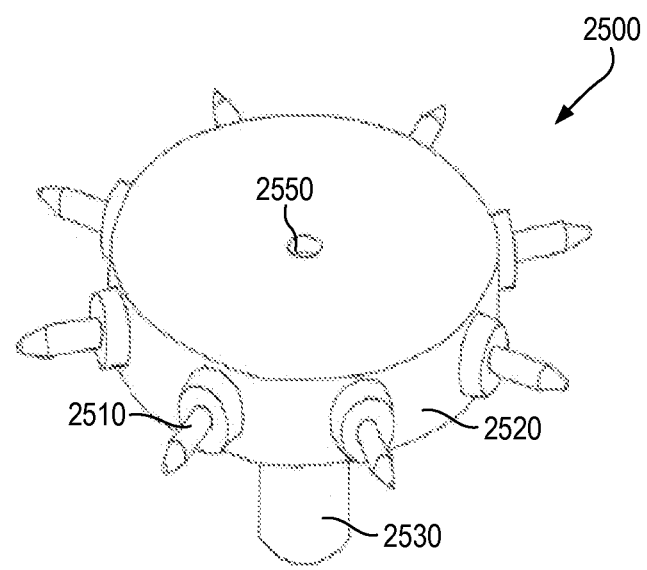
FIG. 25 depicts a fiber producing device that includes a plurality of syringe ends.

FIG. 25 depicts an alternate embodiment of a fiber producing device. Fiber producing device 2500 includes a plurality of syringe couplings 2510 coupled to a body 2520. Syringe couplings 2510 include connectors that allow needles to be removably coupled to body 2520. Body 2520 includes opening 2550, through which material to be spun may be introduced into the body. In an embodiment, body 2520 is substantially cylindrical and syringe couplings 2510 are substantially evenly disposed around the body. While FIG. 25 depicts eight syringe couplings 2510, it should be understood that more or less syringe couplings may be coupled to body 2520. Body 2520 includes a coupling member 2530 that may be used to couple the body to a driver that is capable of rotating the body.

Figure 17:
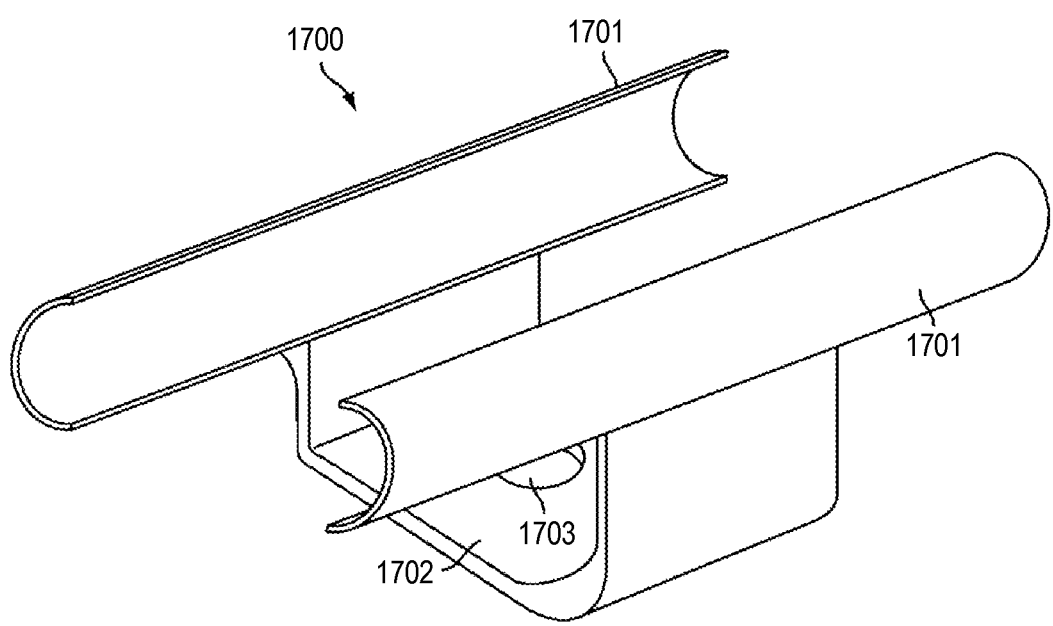
FIG. 17 depicts an alternate embodiment of a syringe support device.

FIG. 17 shows a syringe support device 1700 that may act as a fiber collection device. Syringe support device 1700 includes opposing arcuate (curved) walls 1701 configured to contact the cylindrical outer wall of a syringe, and a base 1702 that includes a hole 1703. Fibers may collect on the exterior of walls 1701 as they exit fiber producing device 1700, thus the syringe support device may also act as a fiber collection device.

Syringe based fiber producing devices may be used to collect mat fibers. If mat fibers are not being collected, one reason may be that the fiber producing device is disturbing the stagnation zone. Thus, with respect to the embodiments of FIGS. 13-17, it was determined that to minimize disturbance of the stagnation zone, typically the syringe support device/fiber collection device should be about the size of the syringe, ±20% (in terms of both diameter and length). In certain embodiments employing syringes, design of a syringe support device may be done using this parameter in mind.

Figure 18A:
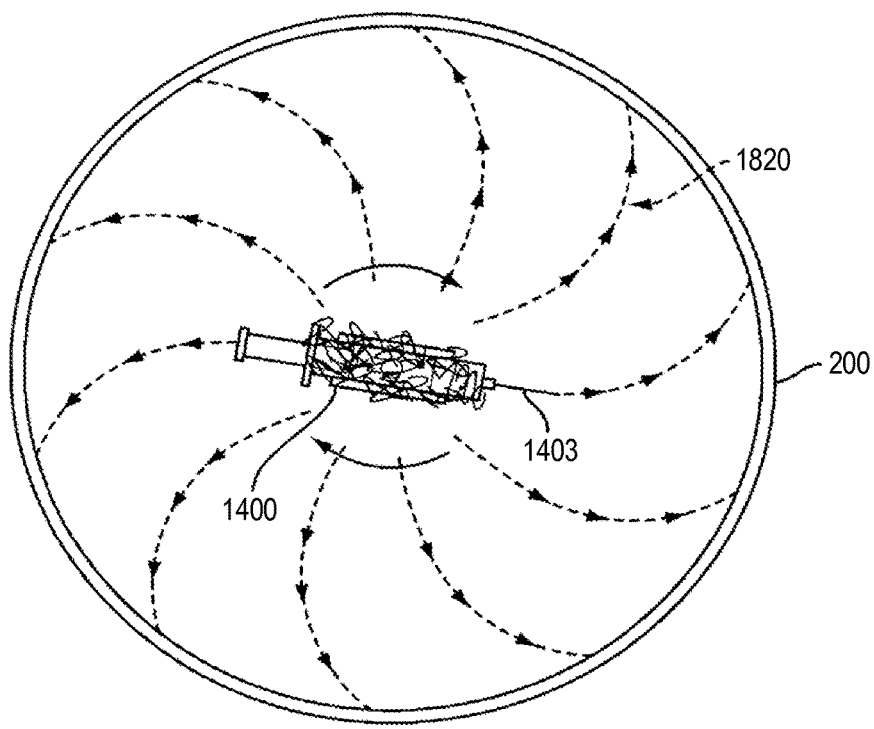
FIG. 18A shows a top view of a fiber producing device that includes a syringe based fiber producing device and a collection wall.
Figure 18B:
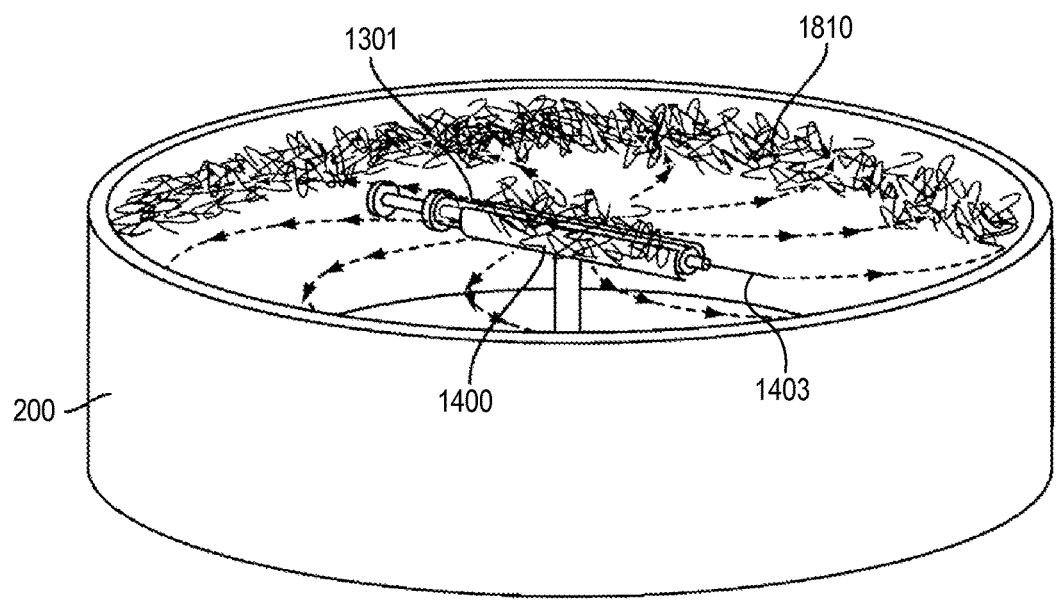
FIG. 18B shows a projection view of a fiber producing device that includes a syringe based fiber producing device and a collection wall.

FIG. 18A shows a top view of a fiber producing system that includes a fiber producing device 1400 as depicted in FIGS. 14A and 14B and a collection wall 200. FIG. 18B shows a projection view of a fiber producing system that includes a fiber producing device 1400 as depicted in FIGS. 14A and 14B and a collection wall 200. As depicted, fiber producing device 1400 is spinning clockwise about a spin axis, and material is exiting needle 1403 of syringe 1301 as fibers 1810 along various pathways 1820. Fibers are collected on the interior of the surrounding collection wall 200 as well as on fiber producing device 1400, such that the syringe support device also acts as a fiber collection device.

Figure 19A:
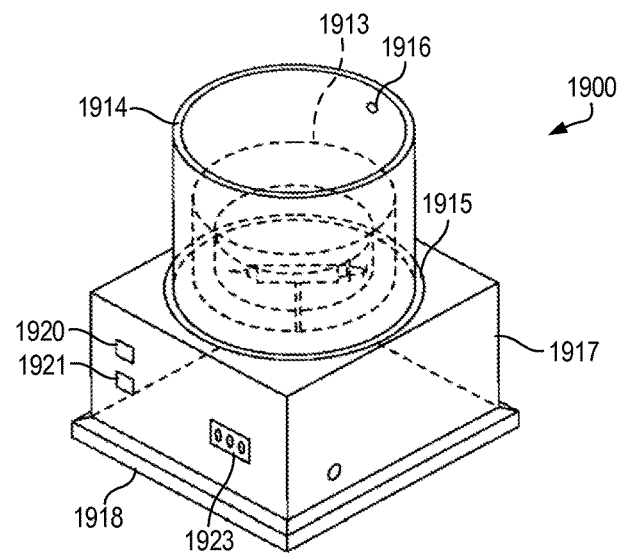
FIG. 19A shows a partially cut-away perspective view of an embodiment of a fiber producing system having a syringe based fiber producing device.
Figure 19B:
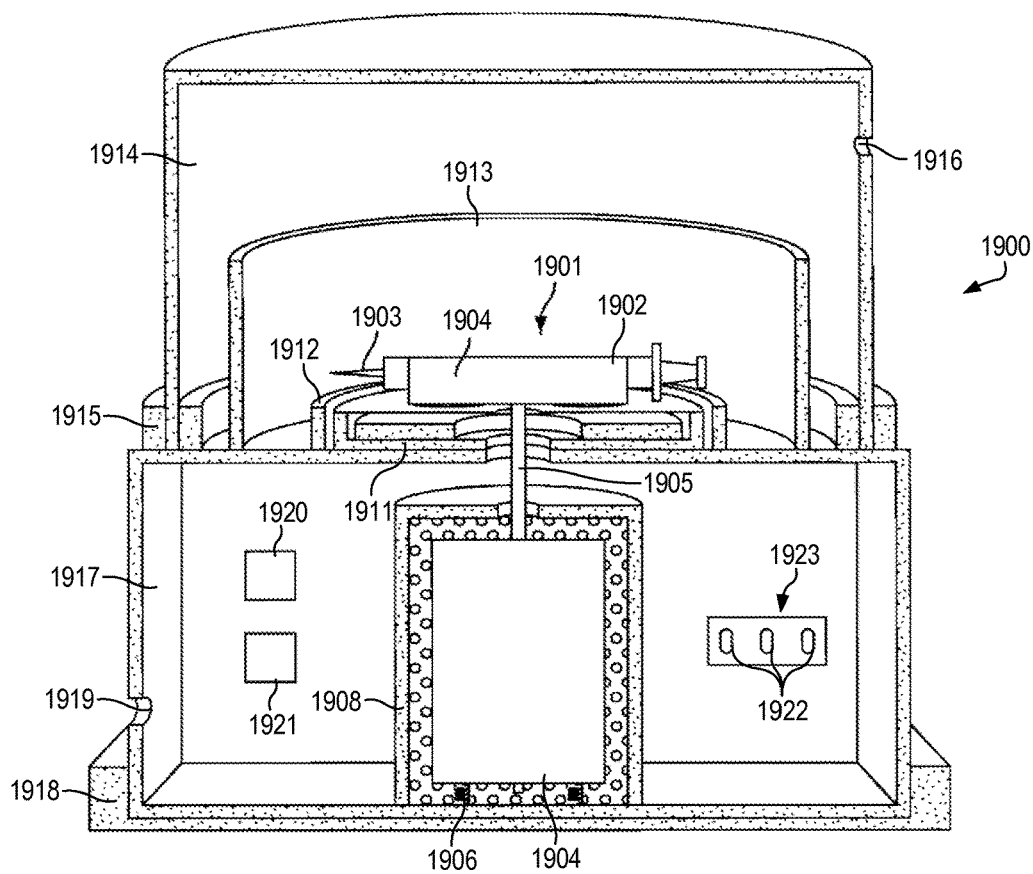
FIG. 19B depicts a cross-sectional view of a fiber producing system having a syringe based fiber producing device.

FIG. 19A shows a partially cut-away perspective view of an embodiment of a fiber producing system 1900 having a syringe based fiber producing device 1901. FIG. 19B depicts a cross-sectional view of fiber producing system 1900. System 1900 includes syringe based fiber producing device 1901, which includes syringe 1902, syringe support 1904 and needle 1903 and is coupled to motor 1907 via a shaft 1905. Motor 1904, such as a variable speed motor, is supported by support springs 1906 and is surrounded by vibration insulation 1907 (e.g., high-frequency vibration insulation). A motor housing 1908 encases the motor 1904, support springs 1906 and vibration insulation 1907. A heating unit 1909 is enclosed within enclosure 1910 (e.g., a heat reflector wall) that has openings (not shown) that direct heat (thermal energy) to fiber producing device 1901. In the embodiment shown, heating unit 1909 is disposed on thermal insulation 1911. Surrounding the enclosure 1910 is a collection wall 1912, which, in turn, is surrounded by an intermediate wall 1913. A housing 1914 seated upon a seal 1915 encases fiber producing device 1901, heating enclosure 1910, collection wall 1912 and intermediate wall 1913. An opening 1916 in the housing 1914 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 1917 which is supported by a base 1918. An opening 1919 in the wall 1917 allows for further control of the conditions of the internal environment of the apparatus. Indicators for power 1920 and electronics 1921 are positioned on the exterior of the wall 1917 as are control switches 1922 and a control box 1923.

Figure 20A:
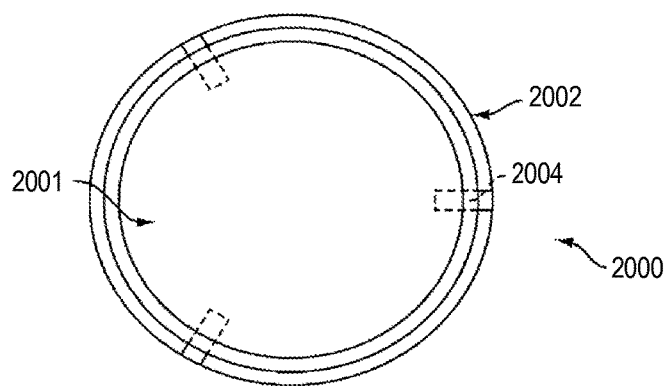
FIG. 20A depicts a projection view of an embodiment of a fiber producing device that includes a concave reservoir.
Figure 20B:
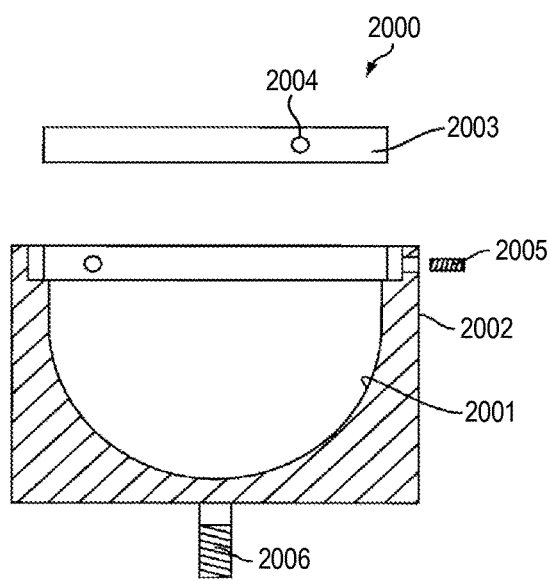
FIG. 20B depicts a top view of an embodiment of a fiber producing device that includes a concave reservoir.
Figure 20C:
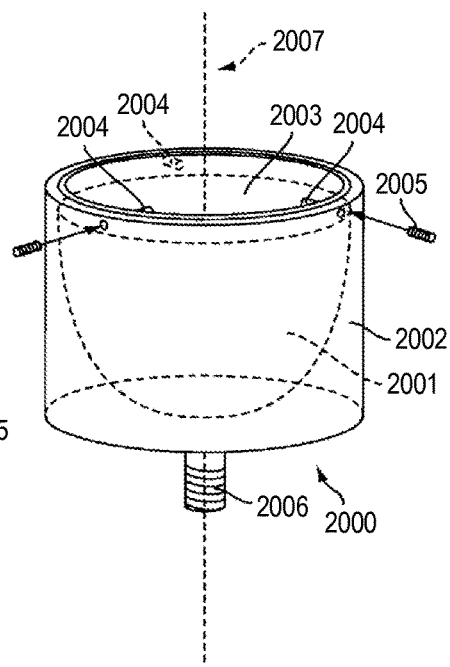
FIG. 20C depicts a side view of an embodiment of a fiber producing device that includes a concave reservoir.

Yet another embodiment of a fiber producing device is shown in FIGS. 20A-20C. Fiber producing device 2000 includes a reservoir 2001 in the shape of a concave cavity centered within wall 2002. Typically, about 100 mL to about 1,000 mL of material are placed in the reservoir, but amounts less than this may be used as well as amounts greater than this, as the size of the reservoir and the fiber producing device may each vary. Fiber producing device 2000 also includes lid 2003, which includes threaded holes 2004 that allow the lid 2003 to be secured to the reservoir 2001 using one or more screws 2005. Not every threaded hole 2004 need be used for securing the lid to the reservoir 2001, at least one hole 2004 may also act as an opening through which material may exit during spinning. In certain embodiments, material may exit the reservoir 2001 via a gap between the lid 2003 and the reservoir. A threaded joint 2006, such as a universal threaded joint, is shown attached to the base of the fiber producing device. The spin axis 2007 of this fiber producing device extends centrally and vertically through the reservoir 2001. Fiber producing device 2000 may be used for melt spinning or solution spinning. In certain embodiments, fiber producing device 2000 is spun for about 10 seconds to about 5,000 seconds to form fibers. Fiber producing device 2000 may also be operated in a continuous mode for longer amounts of time.

Figure 21A:
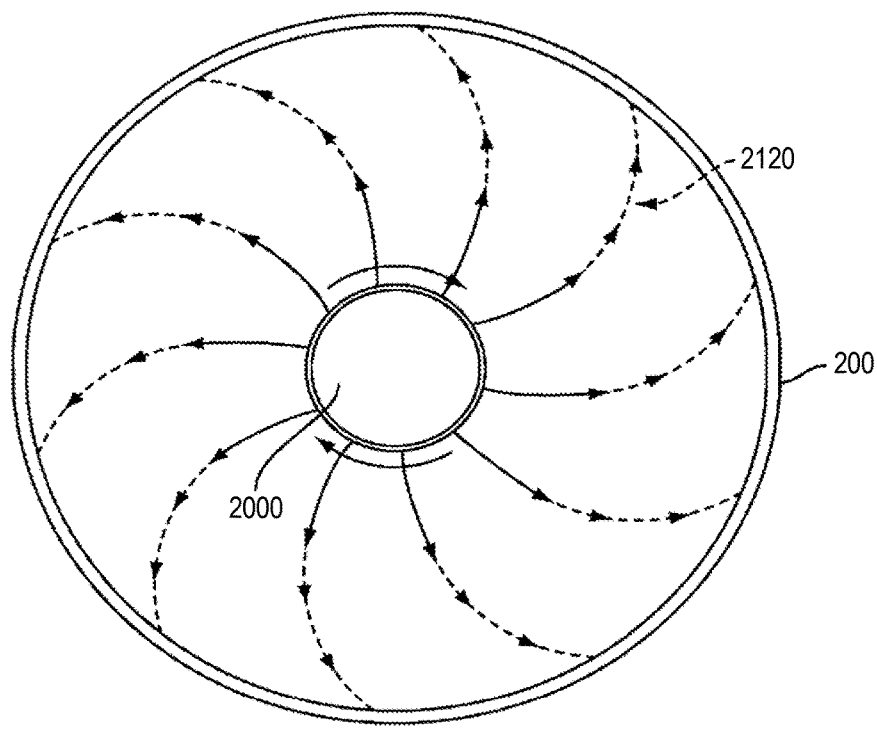
FIG. 21A shows a top view of a fiber producing device that includes a fiber producing device having a concave reservoir.

FIG. 21A shows a top view of a fiber producing device that includes a fiber producing device 2000 as depicted in FIGS. 20A and 20B and a collection wall 200. FIG. 18B shows a projection view of a fiber producing device that includes a fiber producing device 2000 as depicted in FIGS. 20A and 20B and a collection wall 200. As depicted, fiber producing device 2000 is spinning clockwise about a spin axis, and material is exiting openings 2004 as fibers 2110 along various pathways 2120. Fibers are collected on the interior of the surrounding collection wall 200.

Figure 22B:
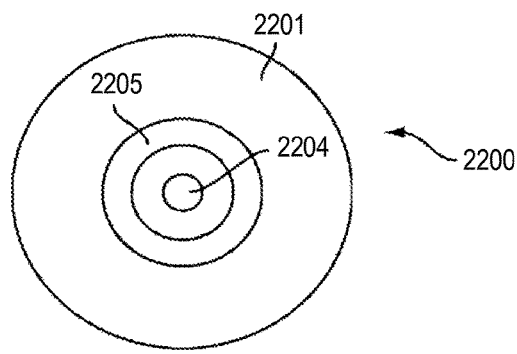
FIG. 22B depicts a top view of an embodiment of a fiber producing device that includes a top plate and a bottom plate, where the top and bottom plates are separated by a mesh material.
Figure 22A:
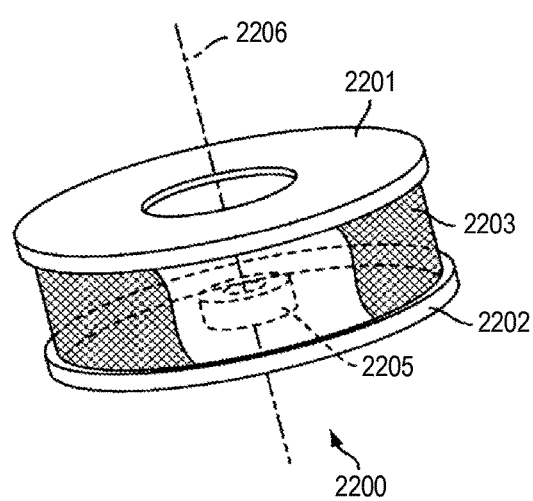
FIG. 22A depicts a projection view of an embodiment of a fiber producing device that includes a top plate and a bottom plate, where the top and bottom plates are separated by a micro-mesh material.
Figure 22C:
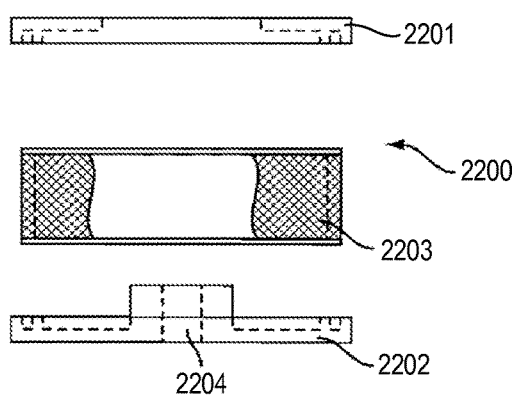
FIG. 22C depicts a side view of an embodiment of a fiber producing device that includes a top plate and a bottom plate, where the top and bottom plates are separated by a mesh material.
Figure 23A:
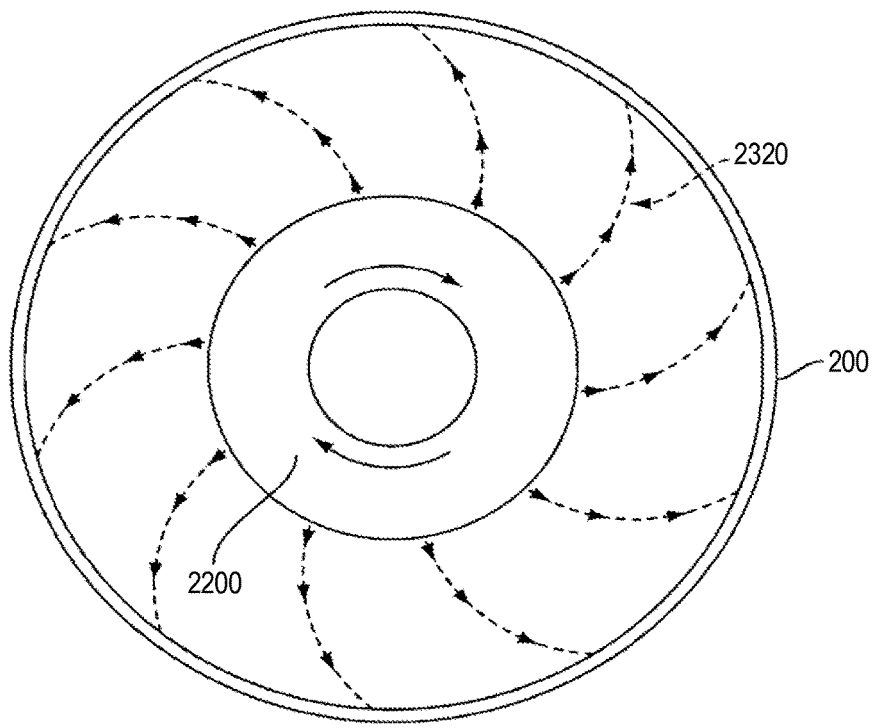
FIG. 23A shows a top view of a fiber producing device that includes a fiber producing device having a mesh material.
Figure 23B:
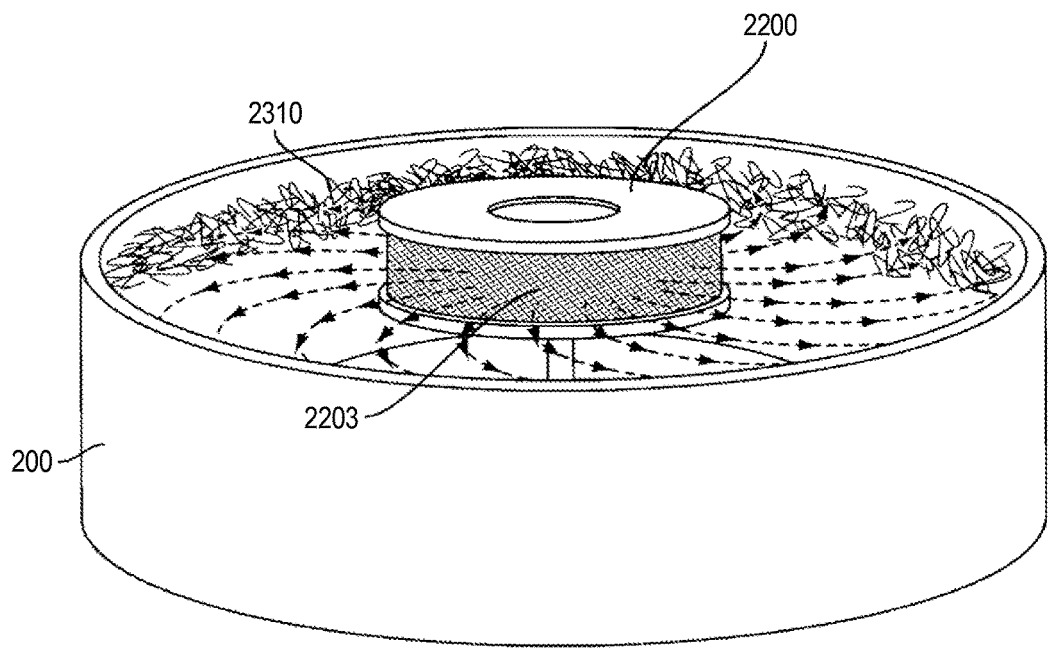
FIG. 23B shows a projection view of a fiber producing device that includes a fiber producing device having a mesh material.

Another embodiment of a fiber producing device is shown in FIGS. 22A-22C. Fiber producing device 2200 includes a top plate 2201 and a bottom plate 2202 separated by a mesh material 2203. The mesh material may be formed from a polymer, a metal (e.g., stainless steel), or a polymer/metal combination. Such mesh materials may be obtained from commercial sources, such as MSC Industrial Supply Co. (cat. no. 52431418). The distance spanned by mesh 2203 between top plate 2201 and bottom plate 2202 may range, for example, between about 1 inch to about 10 inches, or any value or range therein. The distance spanned by mesh 2203 between top plate 2201 and bottom plate 2202 may be 1 inch, 2 inches, 3 inches, 4" inches, 5 inches, 6 inches, 7 inches, 8 inches, 9 inches, or 10 inches. A hole 2204 in bottom plate 2202, that extends through a bottom connector 2205, allows for connection for a threaded joint, such as a universal threaded joint. Fiber producing device 2200 is typically used for melt spinning. Particles of a material (e.g., polymeric particles/beads) may be placed in the bottom plate 2202, which acts as storage, rather than as a reservoir, as with certain other fiber producing devices. It is, however, possible to modify bottom plate 2202 to act a reservoir for liquid material by raising the solid wall of this plate. With such a modification, it is possible to use this fiber producing device for solution spinning. The spin axis 2206 of this fiber producing device extends centrally and vertically through the hole 2204. Fiber producing device 2200 may be operated in a continuous manner in which material is continuously fed to bottom plate 2202.

Figure 21B:
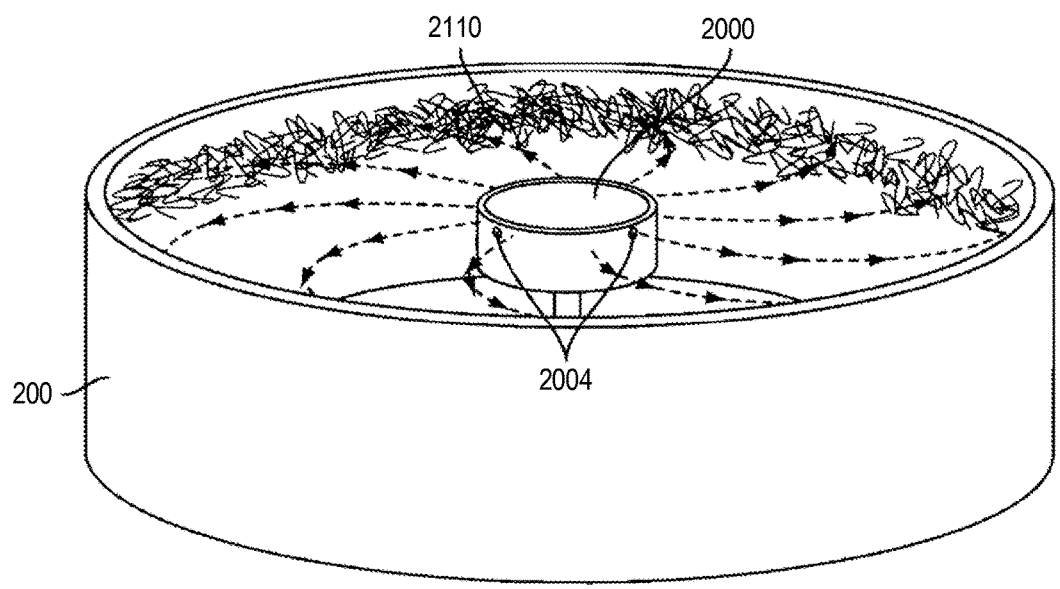
FIG. 21B shows a projection view of a fiber producing device that includes a fiber producing device having a concave reservoir.

FIG. 22A shows a top view of a fiber producing device that includes a fiber producing device 2200 as depicted in FIGS. 21A and 21B and a collection wall 200. FIG. 22B shows a projection view of a fiber producing device that includes a fiber producing device 2200 as depicted in FIGS. 21A and 21B and a collection wall 200. As depicted, fiber producing device 2200 is spinning clockwise about a spin axis, and material is through mesh 2203 as fibers 2310 along various pathways 2320. Fibers are collected on the interior of the surrounding collection wall 200.

In one embodiment, one or more fluoropolymers may be placed into a fiber producing device to produce microfibers and/or nanofibers composed of the one or more fluoropolymers. The term "fluoropolymer" refers to a polymer that includes one or more fluorine atoms bonded to carbon atoms in at least a portion of the repeating units of the polymer. While generally fluoropolymers are composed of carbon, fluorine and hydrogen, flurocarbons may also include chlorine and oxygen atoms. Examples of fluoropolymers include, but are not limited to, polyvinylfluoride (PVF); polyvinylidene fluoride (PVDF); polytetrafluoroethylene (PTFE); polychlorotrifluoroethylene (PCTFE); perfluoroalkoxy polymer (PFA); fluorinated ethylene-propylene (FEP); polyethylenetetrafluoroethylene (ETFE); polyethylenechlorotrifluoroethylene (ECTFE); perfluorinated elastomer; fluorocarbon [Chlorotrifluoroethylenevinylidene fluoride]); and perfluoropolyether (PFPE).

Fluoropolymer fibers may be created using a solution spinning method. In one embodiment, a mixture of one or more fluoropolymers may be dissolved and/or suspended in a suitable solvent. Examples of suitable solvents for dissolving fluoropolymers include fluorinated solvents, and non-fluorinated organic solvents. Examples of fluorinated solvents include, but are not limited to fluorinated hydrocarbons (e.g., perfluorohexane, perfluorodecalin, and perfluorooctane), fluorinated ethers (e.g., perfluorotetrahydrofuran, perfluoro(butyltetrahydrofuran, methyl nonafluorobutyl ether, methyl nonafluoroisobutyl ether, FC-77, Novec® 7100, Novec® 7200), Fluorinert™ Solvents (available from 3M, St. Paul, Minn.). An example of a non-fluorinated organic solvent is dimethylformamide. The mixture of fluoropolymer and solvent may be selected to achieve a desired viscosity. Certain materials may be added for adding value (such as antioxidant or colorant properties) to the desired fibers. As used herein the term "solvent" refers to a liquid which at least partially dissolves a material that is mixed with the solvent.

As the material is ejected from the spinning fiber producing device, thin jets of the material are simultaneously stretched and dried in the surrounding environment. Interactions between the material and the environment at a high strain rate (due to stretching) leads to solidification of the material into fluoropolymers fibers, which may be accompanied by evaporation of solvent. By manipulating the temperature and strain rate, the viscosity of the material may be controlled to manipulate the size and morphology of the fluoropolymer fibers that are created. With appropriate manipulation of the environment and process, it is possible to form fluoropolymer fibers of various configurations, such as continuous, discontinuous, mat, random fibers, unidirectional fibers, woven and unwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by fiber producing device choice.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as "variable speed fiber producing devices." In the methods described herein, the structure that holds the material may be spun at a speed of about 500 RPM to about 25,000 RPM, or any range derivable therein. In certain embodiments, the structure that holds the material is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the structure that holds the material is rotated at a rate of about 5,000 RPM to about 25,000 RPM.

In an embodiment, material may be positioned in a reservoir of the fiber producing device. The reservoir may, for example, be defined by a concave cavity of the fiber producing device. In certain embodiments, the fiber producing device includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body such that a gap exists between the lid and the body, and the nanofiber is created as a result of the rotated material exiting the concave cavity through the gap.

In an embodiment, a fiber producing device includes a syringe that is coupled to a driver. Syringes are commercially available and come in a variety of sizes. A plunger typically is used to hold material in the syringe, although other stoppers may be used for this purpose. On the end opposite of the plunger or stopper is a hole: this hole may be threaded, and a needle may be attached to this hole. A variety of needles are commercially available, including needles of various lengths and gauges. Different needles may be used with a single syringe by exchanging them. A syringe is typically secured to a syringe support device, such that the syringe and the syringe support device are spun together.

For example, the fiber producing device may comprise a syringe and a plunger. Any syringe equipped with a plunger as known to those of skill in the art may be used. The material may be placed in the syringe. Moreover, instead of a plunger, another object may be used that prevents unwanted leakage of the material from the syringe. In certain embodiments, the syringe further comprises a needle that is attached to the syringe. The gauge (G) of the needle may range from, for example, 16 G (1.194 mm) to 25 G (0.241 mm). In certain embodiments, the syringe and plunger are rotated at a rate of about 500 RPM to about 25,000 RPM, or any range derivable therein. In certain embodiments, at least about 10 mL to about 500 mL of the material is positioned in the syringe, and the syringe and plunger are rotated at a rate of about 500 RPM to about 25,000 RPM for about 10 seconds to about 1,000 seconds. In particular embodiments, a syringe support device supports the syringe. The syringe support device may, for example, comprise an elongated structure with open ends and an open top.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Certain fiber producing devices have openings through which material is ejected during spinning. Such openings may take on a variety of shapes (e.g., circular, elliptical, rectangular, square, triangular, or the like) and sizes: (e.g., diameter sizes of 0.01-0.80 mm are typical). The angle of the opening may be varied between ±15 degrees. The openings may be threaded. An opening, such as a threaded opening, may hold a needle, where the needle may be of various shapes, lengths and gauge sizes. Threaded holes may also be used to secure a lid over a cavity in the body of a fiber producing device. The lid may be positioned above the body such that a gap exists between the lid and the body, and a fiber is created as a result of the spun material exiting the cavity through the gap. Fiber producing devices may also be configured such that one fiber producing device may replace another within the same apparatus without the need for any adjustment in this regard. A universal threaded joint attached to various fiber producing devices may facilitate this replacement. Fiber producing devices may also be configured to operate in a continuous manner.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers. For example, regarding nanofibers, a collection wall may be employed that collects at least some of the nanofibers. In certain embodiments, a collection rod collects at least some of the nanofibers. The collection rod may be stationary during collection, or the collection rod may be rotated during collection. For example, the collection rod may be rotated at 50 RPM to about 250 RPM, in certain embodiments. In certain embodiments, an elongated structure with open ends and an open top collects at least some of the nanofibers. As noted above, a syringe support device may comprise an elongated structure with open ends and an open top. In certain embodiments, a syringe support device also collects fibers, such as nanofibers.

Regarding the fibers that are collected, in certain embodiments, at least some of the fibers that are collected are continuous, discontinuous, mat, woven, unwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using air, such as ambient air, that is blown onto the fibers as they are created and/or after they are created.

Present method may further comprise, for example, introducing a gas through an inlet in a housing, where the housing surrounds at least the fiber producing device. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The fibers that are created may be, for example, one micron or longer in length. For example, created fibers may be of lengths that range from about 1 µm to about 50 cm, from about 100 µm to about 10 cm, or from about 1 mm to about 1 cm. In some embodiments, the fibers may have a narrow length distribution. For example, the length of the fibers may be between about 1 µm to about 9 µm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

The preparation of pure PTFE (e.g., Teflon AF) nanofibers was accomplished using centrifugal spinning. The fiber formation process is very stable, produces large amount of fibers (high yield is of extreme importance from the commercial point of view) and produces clean pure PTFE fibers that can be developed into single fibers, non-woven mats or yarns.

A polymer solution of Teflon AF dissolved in Fluorinert FC-40 was spun using dual orifice fiber producing device. The fiber producing device included two needles coupled to the openings in the device. Fibers were formed using 27 gauge needles and 30 gauge needles coupled to the fiber producing device. With either gauge needle, the fiber producing device was run at speeds higher than >8000 rpm. When using 27 gauge needles nanofibers were produced at speeds of about 7000 rpm. With the stated needle gauge, speed and dual orifice spinneret, it only takes 15 seconds (at 10,000 rpm with either gauge needle) to prepare more than 1 g of fibers. Once the fiber producing body was filled, the nozzles were connected.

Figure 26A:
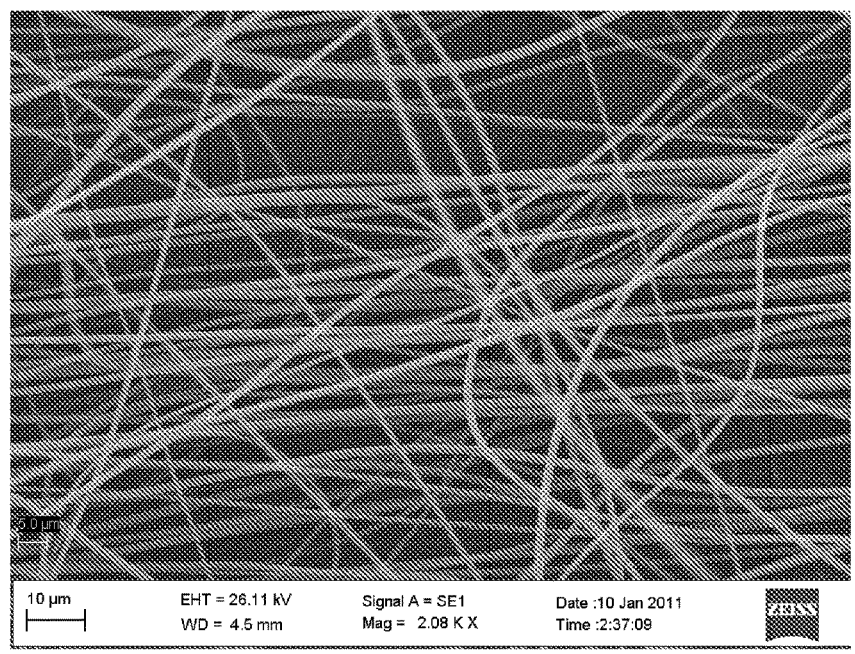
FIGS. 26A-26D show SEM images of nanosize PTFE fibers made by centrifugal spinning.
Figure 26B:
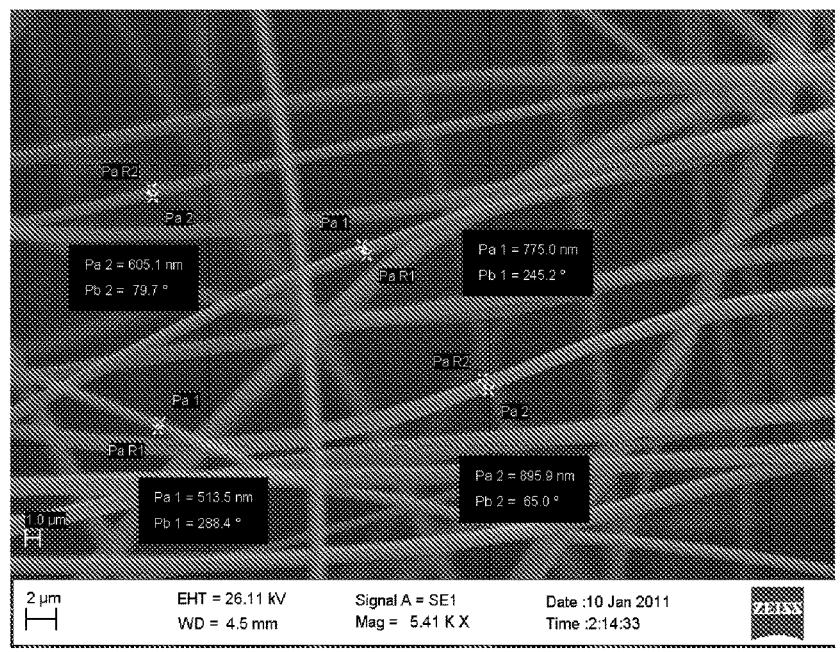
Figure 26C:
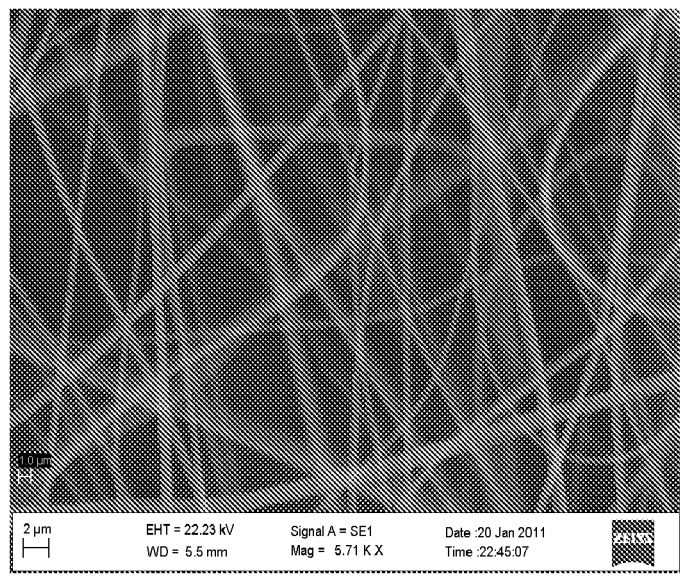
Figure 26D:
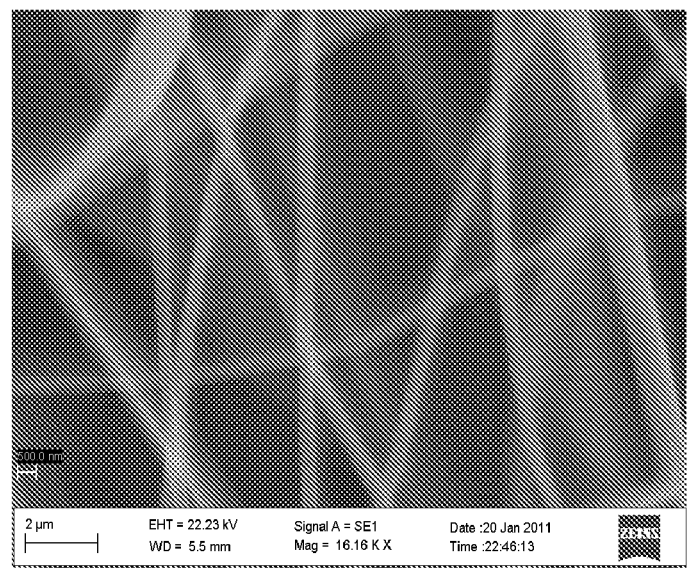
Figure 27A:
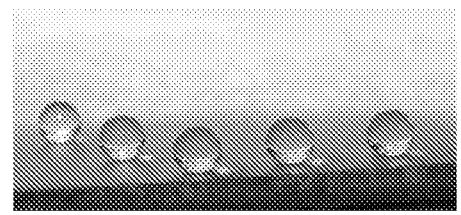
FIG. 27A shows water droplets on a glass slide covered with a PTFE nanofiber mat.
Figure 27B:
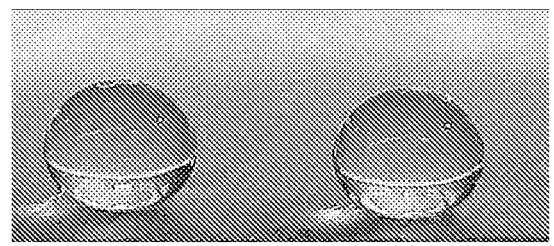
FIG. 27B shows a magnification of the water droplets of FIG. 25A.
Figure 27C:
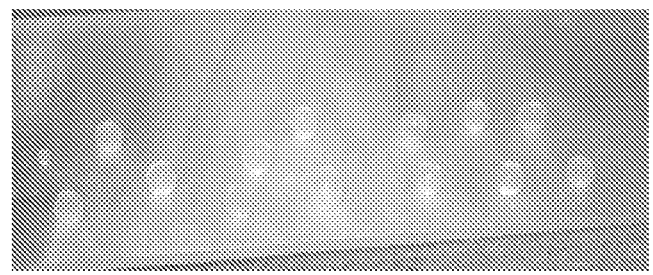
FIG. 27C shows frozen water droplets on a glass slides covered with a PTFE nanofiber mat.

After the spinning cycle, fibers were collected on glass slides as substrates or spun into yarns from the collector. FIGS. 26A-26D show SEM images of nanosize PTFE fibers made by centrifugal spinning. FIGS. 26B-D show increasingly higher magnifications of the same fibers depicted in FIG. 26A. The fibers produced were PTFE nanofibers that exhibited no beading, no interconnections, and no melding. The measured contact angle was no lower than 160° depending on the thickness of the fiber mat. FIG. 27A shows water droplets on a glass slide covered with a PTFE nanofiber mat. FIG. 27B shows a magnification of the water droplets of FIG. 27A. FIG. 27C shows frozen water droplets on a glass slides covered with a PTFE nanofiber mat.

Figure 28:
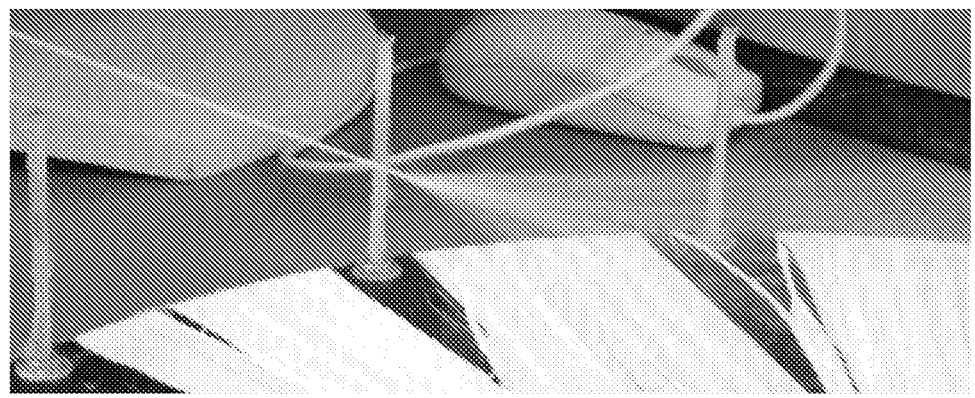
FIG. 28 depicts an apparatus for collecting a fiber into a yarn.

The fibers may be formed into a yarn. Yarn fibers were produced using a yarn collection system as depicted in FIG. 28. A motor attached to the collection system pulls and twists the fibers to form yarns.

What is claimed is:

1. A method of producing fibers, comprising:
   mixing one or more fluoropolymers with a solvent to produce a composition comprising a solution of the one or more fluoropolymers in the solvent;
   placing the composition comprising one or more fluoropolymers into a fiber producing device, the fiber producing device comprising a body comprising a concave cavity and one or more openings in communication with the concave cavity, wherein the composition is placed into the concave cavity of the body;
   rotating the fiber producing device at a speed of at least about 500 rpm, wherein rotation of the fiber producing device causes the composition in the concave cavity of the body of the fiber producing device to be passed from the concave cavity of the body through one or more of the openings to produce microfibers and/or nanofibers comprising one or more of the fluoropolymers; and
   collecting at least a portion of the produced microfibers and/or nanofibers;
   wherein the microfibers and/or nanofibers are created without subjecting the fibers, during their creation, to an externally applied electric field.

2. The method of claim 1, wherein the fiber producing device comprises at least two opposing openings.

3. The method of claim 1, wherein the fiber producing device comprises one or more needles coupled to one or more of the openings.

4. The method of claim 1, further comprising coupling the fiber producing device to a driver, and activating the driver, wherein the driver rotates the fiber producing device.

5. The method of claim 1, further comprising placing the fiber producing device in a chamber, and controlling the environment inside the chamber.

6. The method of claim 1, further comprising collecting fibers on a collection device surrounding at least a portion of the fiber producing device.

7. The method of claim 6, wherein an intermediate wall at least partially surrounds the collection device, and wherein the intermediate wall has a greater height than the collection device.

8. The method of claim 1, further comprising collecting fibers on one or more collection rods surrounding at least a portion of the fiber producing device.

9. The method of claim 1, wherein one or more of the fluoropolymers comprise a polytetrafluoroethylene polymer.

10. The method of claim 1, wherein one or more of the fluoropolymers are dissolved in a fluorinated solvent.

11. The method of claim 1, wherein the fibers are produced at room temperature.

12. The method of claim 1, wherein the composition consists essentially of one or more fluoropolymers in a solvent.

13. The method of claim 1, wherein the composition consists of one or more fluoropolymers in a solvent.

14. The method of claim 1, where the solvent used to form the solution is a fluorinated solvent.

15. The method of claim 1, wherein the fiber producing device comprises a plurality of syringe couplings coupled to one or more of the openings in the body, and a plurality of needles removably coupled to the syringe couplings, wherein rotation of the fiber producing device causes the composition in the fiber producing device to be passed through the plurality of needles to produce microfibers and/or nanofibers comprising one or more of the fluoropolymers.

* * * * *